(12) United States Patent
Piao et al.

(10) Patent No.: US 10,108,903 B1
(45) Date of Patent: Oct. 23, 2018

(54) MOTION DETECTION BASED ON MACHINE LEARNING OF WIRELESS SIGNAL PROPERTIES

(71) Applicant: Cognitive Systems Corp., Waterloo (CA)

(72) Inventors: Yunfeng Piao, Kitchener (CA); Christopher Vytautas Olekas, Breslau (CA); Mikhail Alexand Zakharov, Guelph (CA)

(73) Assignee: Cognitive Systems Corp., Waterloo, Ontario (CA)

( * ) Notice: Subject to any disclaimer, the term of this patent is extended or adjusted under 35 U.S.C. 154(b) by 0 days.

(21) Appl. No.: 15/836,606

(22) Filed: Dec. 8, 2017

(51) Int. Cl.
*G06N 3/08* (2006.01)
*G06N 3/04* (2006.01)
*G01S 7/41* (2006.01)
*G01S 13/04* (2006.01)

(52) U.S. Cl.
CPC .................. *G06N 3/08* (2013.01); *G06N 3/04* (2013.01); *G01S 7/417* (2013.01); *G01S 13/04* (2013.01)

(58) Field of Classification Search
CPC ... G06N 3/08; G06N 3/04; G06N 3/02; G01S 7/417; G01S 13/04; G05B 2219/21002; G08B 13/24; H04W 84/12
USPC .......................................................... 706/20
See application file for complete search history.

(56) References Cited

U.S. PATENT DOCUMENTS

| | | | |
|---|---|---|---|
| 4,054,879 A | 10/1977 | Wright et al. | |
| 4,075,573 A | 2/1978 | Kennedy et al. | |
| 4,193,055 A | 3/1980 | Barnum | |
| 4,225,858 A | 9/1980 | Cole et al. | |
| 4,286,260 A | 8/1981 | Gershberg et al. | |
| 4,649,388 A | 3/1987 | Atlas | |

(Continued)

FOREIGN PATENT DOCUMENTS

| CA | 2834522 | 5/2014 |
|---|---|---|
| CA | 2945702 | 8/2015 |

(Continued)

OTHER PUBLICATIONS

Dekker et al., "Gesture Recognition with a Low Power FMCW Radar and a Deep Convolutional Neural Network", Proceedings of the 14th European Radar Conference, Oct. 11-13, 2017, Nuremberg, Germany.*

(Continued)

*Primary Examiner* — Dave Misir
(74) *Attorney, Agent, or Firm* — Henry Patent Law Firm PLLC

(57) ABSTRACT

In a general aspect, motion in a space can be detected based on machine learning of wireless signal properties. In some aspects, sets of tagged neural network input data are obtained at a neural network training system. Each set of tagged neural network input data is based on a statistical analysis of a series of wireless signals transmitted through a space over a respective time period, and each set of the tagged neural network input data includes a tag indicating whether motion occurred in the space over the respective time period. The sets of tagged neural network input data are processed by the neural network training system to parameterize nodes of a neural network system. Parameterizing the nodes configures the neural network system to detect motion based on untagged neural network input data.

24 Claims, 12 Drawing Sheets

(56) References Cited

U.S. PATENT DOCUMENTS

| | | | |
|---|---|---|---|
| 4,740,045 A | 4/1988 | Goodson et al. | |
| 4,870,663 A | 9/1989 | Kulju et al. | |
| 5,270,720 A | 12/1993 | Stove | |
| 5,490,062 A | 2/1996 | Leach et al. | |
| 5,519,400 A | 5/1996 | McEwan | |
| 5,696,514 A | 12/1997 | Nathanson et al. | |
| 6,075,797 A | 6/2000 | Thomas | |
| 6,493,380 B1 | 12/2002 | Wu et al. | |
| 6,573,861 B1 | 6/2003 | Hommel et al. | |
| 7,047,015 B2 | 5/2006 | Hawe | |
| 7,295,109 B2 | 11/2007 | Kobayashi | |
| 7,317,419 B2 | 1/2008 | Sugar et al. | |
| 7,652,617 B2 | 1/2010 | Kurtz et al. | |
| 7,916,066 B1 | 3/2011 | Osterweil | |
| 8,138,918 B2 | 3/2012 | Habib | |
| 8,331,498 B2 | 12/2012 | Huang et al. | |
| 8,477,750 B2 | 7/2013 | Agarwal et al. | |
| 8,710,984 B2 | 4/2014 | Wilson et al. | |
| 8,818,288 B2 | 8/2014 | Patwari et al. | |
| 8,836,344 B2 | 9/2014 | Habib et al. | |
| 9,030,321 B2 | 5/2015 | Breed | |
| 9,143,413 B1 | 9/2015 | Manku et al. | |
| 9,143,968 B1 | 9/2015 | Manku et al. | |
| 9,229,102 B1 | 1/2016 | Wright et al. | |
| 9,523,760 B1 | 12/2016 | Kravets et al. | |
| 9,524,628 B1 | 12/2016 | Omer et al. | |
| 9,551,784 B2 | 1/2017 | Katuri | |
| 9,584,974 B1 | 2/2017 | Omer et al. | |
| 9,743,294 B1* | 8/2017 | Omer | H04W 24/02 |
| 9,927,519 B1 | 3/2018 | Omer et al. | |
| 9,933,517 B1 | 4/2018 | Olekas et al. | |
| 9,989,622 B1 | 6/2018 | Griesdorf et al. | |
| 2001/0046870 A1 | 11/2001 | Stilp et al. | |
| 2003/0007473 A1 | 1/2003 | Strong et al. | |
| 2003/0108119 A1 | 6/2003 | Mohebbi et al. | |
| 2005/0055568 A1 | 3/2005 | Agrawala et al. | |
| 2005/0083199 A1 | 4/2005 | Hall et al. | |
| 2006/0217132 A1 | 9/2006 | Drummond-Murray et al. | |
| 2007/0293232 A1 | 12/2007 | Nonaka | |
| 2007/0296571 A1 | 12/2007 | Kolen | |
| 2008/0119130 A1 | 5/2008 | Sinha | |
| 2008/0240008 A1 | 10/2008 | Backes et al. | |
| 2008/0303655 A1 | 12/2008 | Johnson | |
| 2009/0040952 A1 | 2/2009 | Cover et al. | |
| 2009/0062696 A1 | 3/2009 | Nathan et al. | |
| 2009/0079615 A1 | 3/2009 | Wu et al. | |
| 2009/0128302 A1 | 5/2009 | Srinivasan et al. | |
| 2009/0128360 A1 | 5/2009 | Bianchi et al. | |
| 2010/0013636 A1 | 1/2010 | Wu | |
| 2010/0026490 A1 | 2/2010 | Butler et al. | |
| 2010/0103020 A1 | 4/2010 | Wu | |
| 2010/0130229 A1 | 5/2010 | Sridhara et al. | |
| 2010/0315284 A1 | 12/2010 | Trinza et al. | |
| 2011/0130092 A1 | 6/2011 | Yun et al. | |
| 2011/0148689 A1 | 6/2011 | Filippi et al. | |
| 2012/0009882 A1* | 1/2012 | Patwari | H04B 17/0072 455/67.11 |
| 2012/0011365 A1 | 1/2012 | Schmidt et al. | |
| 2012/0115512 A1 | 5/2012 | Grainger et al. | |
| 2012/0146788 A1 | 6/2012 | Wilson et al. | |
| 2012/0184296 A1 | 7/2012 | Milosiu | |
| 2012/0212366 A1 | 8/2012 | Alalusi | |
| 2013/0005280 A1 | 1/2013 | Leung et al. | |
| 2013/0090151 A1 | 4/2013 | Ngai et al. | |
| 2013/0162459 A1 | 6/2013 | Aharony et al. | |
| 2013/0283256 A1 | 10/2013 | Proud | |
| 2014/0004874 A1 | 1/2014 | Schwartz et al. | |
| 2014/0015706 A1* | 1/2014 | Ishihara | G08B 21/22 342/27 |
| 2014/0128778 A1 | 5/2014 | Chan et al. | |
| 2014/0135042 A1 | 5/2014 | Buchheim et al. | |
| 2014/0140231 A1 | 5/2014 | Haiut et al. | |
| 2014/0247179 A1 | 9/2014 | Furuskog | |
| 2014/0285324 A1 | 9/2014 | Austin | |
| 2014/0286380 A1 | 9/2014 | Prager et al. | |
| 2014/0301260 A1 | 10/2014 | Park et al. | |
| 2015/0043377 A1 | 2/2015 | Cholas et al. | |
| 2015/0063323 A1 | 3/2015 | Sadek et al. | |
| 2015/0078295 A1 | 3/2015 | Mandyam et al. | |
| 2015/0098377 A1 | 4/2015 | Amini et al. | |
| 2015/0189528 A1 | 7/2015 | Carbajal | |
| 2015/0195100 A1 | 7/2015 | Imes et al. | |
| 2015/0212205 A1 | 7/2015 | Shpater | |
| 2015/0245164 A1 | 8/2015 | Merrill | |
| 2015/0292879 A1 | 10/2015 | Zhou et al. | |
| 2015/0338507 A1 | 11/2015 | Oh et al. | |
| 2015/0350976 A1 | 12/2015 | Kodali et al. | |
| 2016/0018508 A1 | 1/2016 | Chen et al. | |
| 2016/0183059 A1 | 6/2016 | Nagy et al. | |
| 2016/0187475 A1 | 6/2016 | Horng et al. | |
| 2016/0210838 A1 | 7/2016 | Yan et al. | |
| 2016/0241999 A1 | 8/2016 | Chin et al. | |
| 2017/0042488 A1* | 2/2017 | Muhsin | A61B 5/742 |
| 2017/0146656 A1 | 5/2017 | Belsley et al. | |
| 2017/0195893 A1 | 7/2017 | Lee et al. | |
| 2017/0309146 A1* | 10/2017 | MacKenzie | G01S 13/003 |
| 2017/0323154 A1 | 11/2017 | Kollmann et al. | |
| 2017/0343658 A1* | 11/2017 | Ramirez | G01S 13/56 |

FOREIGN PATENT DOCUMENTS

| | | |
|---|---|---|
| WO | 2014/021574 | 2/2014 |
| WO | 2014201574 | 12/2014 |
| WO | 2015/168700 | 11/2015 |

OTHER PUBLICATIONS

Hyder et al., "Acoustic Scene Classification using a CNN-SuperVector system trained with Auditory and Spectrogram Image Features", INTERSPEECH 2017, Aug. 20-24, 2017, Stockholm, Sweden.*

Li et al., "A Convolutional Neural Network Cascade for Face Detection", IEEE, 2015.*

Zheng et al., "Time Series Classification Using Multi-Channels Deep Convolutional Neural Networks", WAIM 2014, LNCS 8485, pp. 298-310, 2014.*

Tsironi et al., "Gesture Recognition with a Convolutional Long Short-Term Memory Recurrent Neural Network", ESANN 2016 proceedings, European Symposium on Artificial Neural Networks, Computational Intelligence and Machine Learning. Bruges (Belgium), Apr. 27-29, 2016.*

Canadian Intellectual Property Office, International Search Report and Written Opinion for International Application No. PCT/CA2017/050037 dated Apr. 13, 2017, 12 pages.

USPTO, Notice of Allowance issued in U.S. Appl. No. 15/461,125 dated Aug. 30, 2017, 15 pages.

USPTO, Non-Final Office Action issued in U.S. Appl. No. 15/691,195 dated Nov. 15, 2017, 17 pgs.

Canadian Intellectual Property Office, International Search Report and Written Opinion issued International Application No. PCT/CA2016/051228 dated Apr. 25, 2017, 8 pages.

Canadian Intellectual Property Office, International Search Report and Written Opinion issued in International Application No. PCT/CA2016/051466 dated Mar. 14, 2017, 9 pages.

"A Guide to TF Layers: Building a Convolutional Neural Network", TensorFlow; https://www.tensorflow.org/tutorials/layers; downloaded Nov. 20, 2017, 17 pgs.

"An Intuitive Explanation of Convolutional Neural Networks", the data science blog; https://ujjwalkam.me/2016/08/11/intuitive-explanation-convnets/, Sep. 15, 2017, 23 pgs.

"Apple Insider; "Intel to reportedly supply LTD chips for 2016 iPhone"; http://appleinsider.com/articles/15/03/11/intel-to-reportedly-supply-ltd-chips-for-2016-iphone; 2 pages; May 15, 2016."

"Artificial neural network", Wikipedia; https://en.wikipedia.org/wiki/Artificial_neural_network; downloaded Sep. 15, 2017, 39 pgs.

"CEVA; "CEVA's DSP Cores Power the World's Leading Mobile Broadband and M2M Applications"; http://www.ceva-dsp.com/Mobile-Broadband; 3 pages; May 15, 2016.".

(56) References Cited

OTHER PUBLICATIONS

"Convolutional neural network", Wikipedia; https://en.wikipedia.org/wiki/Convolutional_neural_network; downloaded Sep. 15, 2017, 19 pgs.
"Japan Radio Co., Ltd; "26GHz FWA—Technology"; http://www.jrc.co.jp/eng/product/lneup/26ghz_wireless_ip_access_system/tech.html; 3 pages; May 15, 2016."
"Non-Final Office Action received in U.S. Appl. No. 15/099,833, dated Jun. 27, 2016, 16 pages."
"Non-Final Office Action received in U.S. Appl. No. 15/151,571, dated Aug. 5, 2016, 18 pages."
"Notice of Allowance received in U.S. Appl. No. 15/099,833, dated Oct. 14, 2016, 8 pages."
"Notice of Allowance received in U.S. Appl. No. 15/151,571, dated Jan. 10, 2017, 9 pages."
"Notice of Allowance received in U.S. Appl. No. 15/228,418, dated Oct. 12, 2016, 9 pages."
"quora.com; "What is the function of the baseband processor in wireless devices?"; https://ww.quora.com/What-is-the-function-of-the-baesband-processor-in-wireless-devices; 2 pages; May 15, 2016."
"Wikipedia; "Baseband processor"; rhttps://en.wikipedia.org/wiki/Bandband_processor; 2 pages; version dated Apr. 20, 2016."
CIPO, "International Search Report and Written Opinion", in International Application No. PCT/CA2016/051229, dated Jan. 17, 2017, 9 pages.
Netgear, "N600 Wifi Cable Modem Router, Model C3700 User Manual", https://web.archive.org/web/20150121182848/http://www.downloads.netgear.com/files/GDC/C3700_UM_21Aug2014.pdf (archive of URL http://www.downloads.netgear.com/files/GDC/C3700_UM_21Aug2014.pdf captured on Jan. 21, 2015, 101 pages.
Openwrt, "Wireless Configuration", https://web.archive.org/web/20140402033233/http://wiki.openwrt.org/doc/uci/wireless (capture of URL http://wiki.openwrt.org/doc/uci/wireless on Apr. 2, 2014), 22 pages.
USPTO, Final Office Action received in U.S. Appl. No. 15/176,489 dated Jun. 23, 2017, 23 pages.
USPTO, Notice of Allowance issued in U.S. Appl. No. 15/460,643 dated Jun. 12, 2017, 34 pages.
USPTO, Non-final Office Action issued in U.S. Appl. No. 15/461,125 dated Apr. 19, 2017, 56 pages.
USPTO, "Non-final Office Action", issued in U.S. Appl. No. 15/176,489 dated Mar. 22, 2017, 41 pages.
USPTO, Non-Final Office Action dated Dec. 28, 2017, in U.S. Appl. No. 15/789,761, 31 pgs.
USPTO, Non-Final Office Action received in U.S. Appl. No. 15/799,768 dated Dec. 13, 2017, 7 pgs.
Youssef, Moustafa, et al., "Challenges: Device-free Passive Localization for Wireless Environments", Mobicom 07 Proceedings of the 13th Annual ACM International Conference on Mobile Computing and Networking, Sep. 2007, 31 pgs.
USPTO; Restriction Requirement dated Jan. 23, 2018, in U.S. Appl. No. 15/706,295.
USPTO, Notice of Allowance dated Jan. 10, 2018, in U.S. Appl. No. 15/803,189, 28 pgs.
USPTO; Non-Final Office Action dated Jan. 23, 2018, in U.S. Appl. No. 15/789,815, 35 pgs.
Wei, et al., "Radio-based Device-free Activity Recognition with Radio Frequency Interference", IPSN '15 Proceedings of the 14th International Conference on Information Processing in Sensor Networks, Apr. 13-16, 2015, 12 pgs.
Zheng, et al., "Detecting Radio Frequency Interference for CSI Measurements on COTS WiFi Devices", IEEE ICC 2017, Ad-Hoc and Sensor Networking Symposium, May 2017, 6 pgs.
USPTO, Notice of Allowance dated Jan. 29, 2018, in U.S. Appl. No. 15/461,125, 16 pgs.
USPTO, Notice of Allowance dated Feb. 13, 2018, in U.S. Appl. No. 15/683,637, 25 pgs.
USPTO, Non-Final Office Action dated Feb. 7, 2018, in U.S. Appl. No. 15/176,489, 30 pgs.
USPTO, Non-Final Office Action dated Jan. 26, 2018, in U.S. Appl. No. 15/815,199, 36 pgs.
CIPO, International Search Report and Written Opinion dated Jan. 26, 2018, in PCT/CA2017/051290, 9 pgs.
USPTO, Notice of Allowance dated May 2, 2018, in U.S. Appl. No. 15/691,195, 21 pgs.
USPTO, Notice of Allowance dated May 1, 2018, in U.S. Appl. No. 15/799,768, 27 pgs.
USPTO, Non-Final Office Action dated Mar. 14, 2018, in U.S. Appl. No. 15/706,295, 39 pgs.
USPTO, Notice of Allowance dated Mar. 8, 2018, in U.S. Appl. No. 15/706,193, 40 pgs.
USPTO, Restriction Requirement, in U.S. Appl. No. 15/799,806, 5 pgs.
CIPO, International Search Report and Written Opinion dated Feb. 9, 2018, in PCT/CA2017/051276, 9 pgs.
WIPO, International Search Report and Written Opinion dated Apr. 25, 2018, in PCT/CA2018/050046, 9 pgs.
WIPO, International Search Report and Written Opinion dated Aug. 21, 2018, in PCT/CA2018/050144, 9 pgs.

* cited by examiner

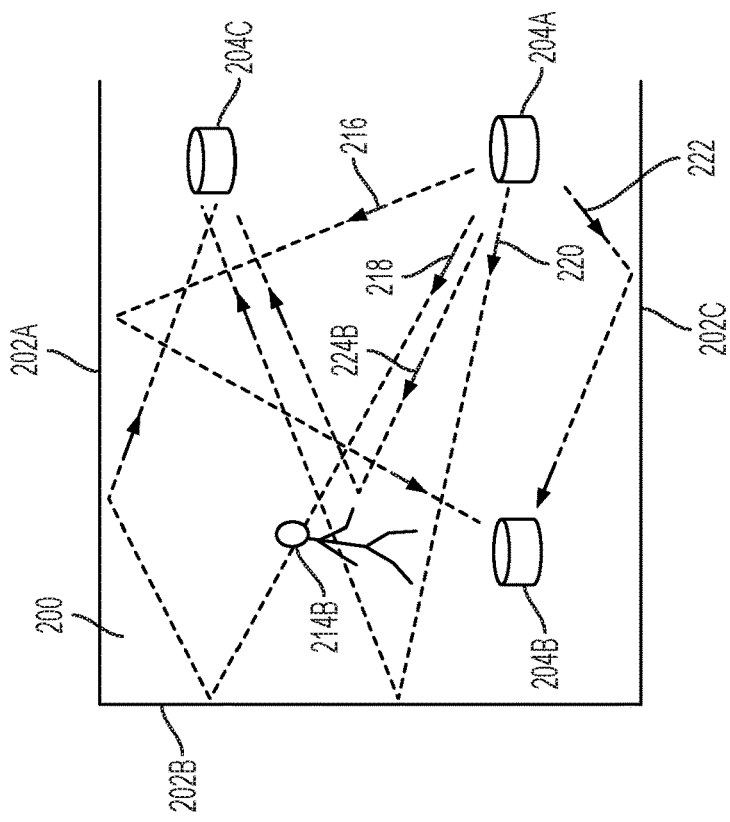
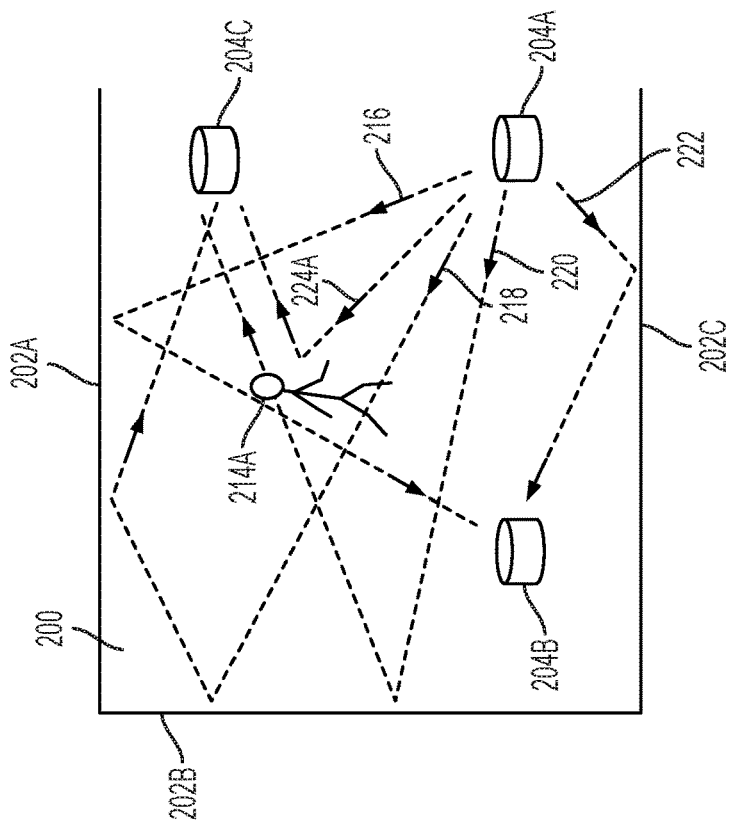
FIG. 2A
FIG. 2B

MOTION DETECTION BASED ON MACHINE LEARNING OF WIRELESS SIGNAL PROPERTIES

BACKGROUND

The following description relates to motion detection.

Motion detection systems have been used to detect movement, for example, of objects in a room or an outdoor area. In some example motion detection systems, infrared or optical sensors are used to detect movement of objects in the sensor's field of view. Motion detection systems have been used in security systems, automated control systems and other types of systems.

DESCRIPTION OF DRAWINGS

FIGS. 2A and 2B are diagrams showing example wireless signals communicated between wireless communication devices.

DETAILED DESCRIPTION

In some aspects of what is described here, motion in a space can be detected based on machine learning of wireless signal properties. For example, in some instances, sets of tagged data for wireless signals may be used to train a neural network system that includes a convolutional neural network. The tagged data may be based on a statistical analysis performed on a representation of the wireless signals. The tagged data may include an indication of whether motion has occurred in the space, whether interference is present in the space, or whether no motion or interference is present (quiet state). The data may be tagged with such an indication based on an analysis performed on the statistical data, based on information gathered during a learning phase, or based on another analysis.

Once trained, the neural network system may be used to detect whether motion has occurred in a space based on untagged data. The untagged data may be formatted in the same manner as the tagged data, but without an indication of whether motion has occurred. The neural network system may process the untagged data using nodes that were programmed during the training process to provide an output that includes a motion indication. The neural network system may include a convolutional neural network system and a fully-connected neural network system. In some instances, mean square error values may be determined for data flagged by the convolutional neural network as being indicative of motion, and the mean square error values may be provided to the fully-connected neural network to provide confirmation of whether motion did actually occur in the space.

Aspects of the present disclosure may provide one or more advantages in some instances. For example, motion may be detected using a neural network that analyzes aspects of wireless signals in an efficient manner. In addition, categories of motion may be identified accurately, causing fewer false-positive detections of motion in a space. In some cases, when a category of motion is accurately detected, an intelligent response to the motion can be initiated automatically. For instance, a security system may be activated in response to detecting motion associated with an intruder but not in response to detecting motion associated with a pet or fan.

Figure 1:
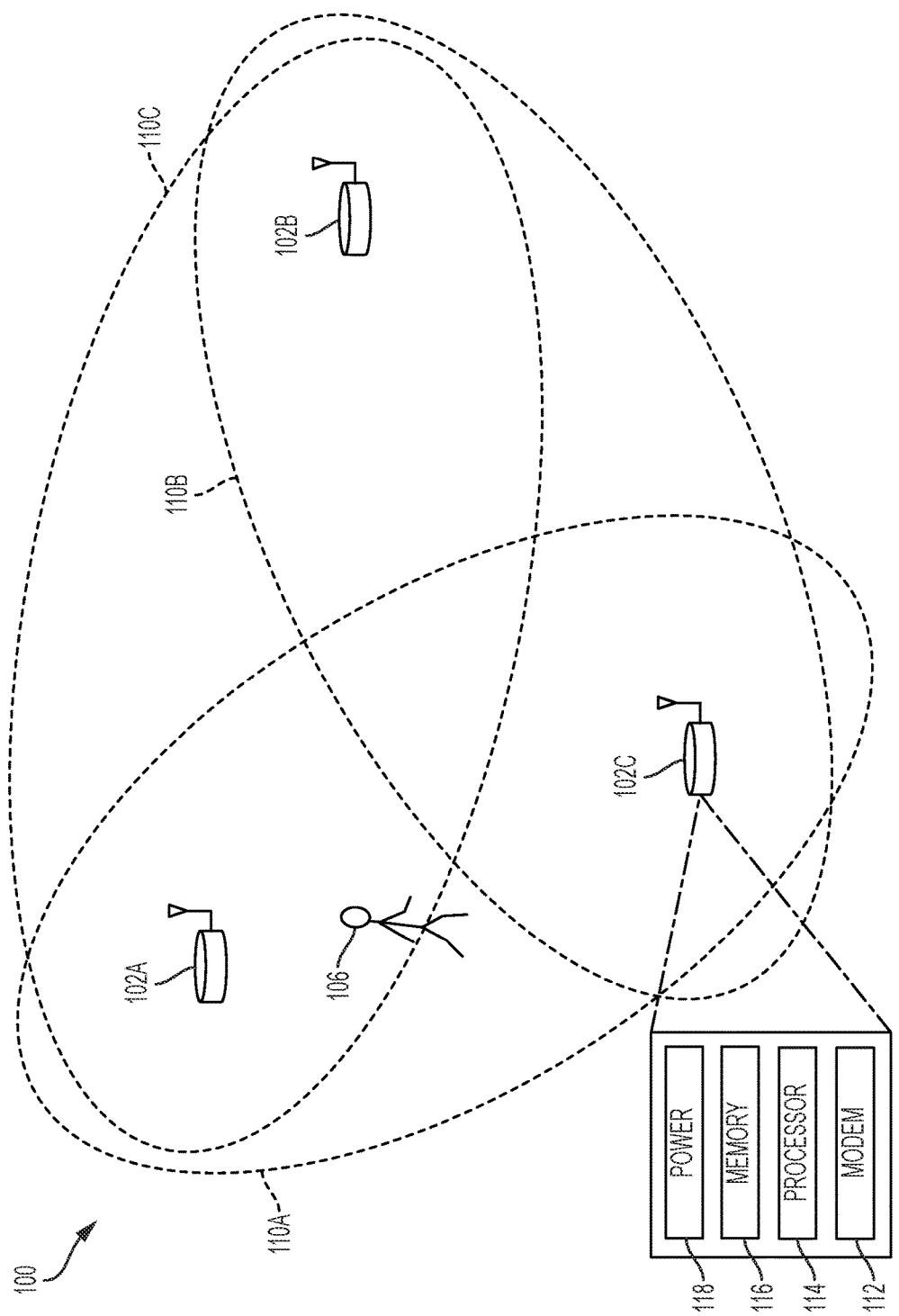
FIG. 1 is a diagram showing an example wireless communication system.

FIG. 1 illustrates an example wireless communication system 100. The example wireless communication system 100 includes three wireless communication devices—a first wireless communication device 102A, a second wireless communication device 102B, and a third wireless communication device 102C. The example wireless communication system 100 may include additional wireless communication devices and other components (e.g., additional wireless communication devices, one or more network servers, network routers, network switches, cables, or other communication links, etc.).

The example wireless communication devices 102A, 102B, 102C can operate in a wireless network, for example, according to a wireless network standard or another type of wireless communication protocol. For example, the wireless network may be configured to operate as a Wireless Local Area Network (WLAN), a Personal Area Network (PAN), a metropolitan area network (MAN), or another type of wireless network. Examples of WLANs include networks configured to operate according to one or more of the 802.11 family of standards developed by IEEE (e.g., Wi-Fi networks), and others. Examples of PANs include networks that operate according to short-range communication standards (e.g., BLUETOOTH®, Near Field Communication (NFC), ZigBee), millimeter wave communications, and others.

In some implementations, the wireless communication devices 102A, 102B, 102C may be configured to communicate in a cellular network, for example, according to a cellular network standard. Examples of cellular networks include networks configured according to 2G standards such as Global System for Mobile (GSM) and Enhanced Data rates for GSM Evolution (EDGE) or EGPRS; 3G standards such as Code Division Multiple Access (CDMA), Wideband Code Division Multiple Access (WCDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); and others.

In the example shown in FIG. 1, the wireless communication devices 102A, 102B, 102C can be, or they may include, standard wireless network components. For example, the wireless communication devices 102A, 102B, 102C may be commercially-available Wi-Fi access points or another type of wireless access point (WAP) performing one or more operations as described herein that are embedded as instructions (e.g., software or firmware) on the modem of the WAP. In some cases, the wireless communication devices 102A, 102B, 102C may be nodes of a wireless mesh network, such as, for example, a commercially-available mesh network system (e.g., GOOGLE WIFI). In some cases, another type of standard or conventional Wi-Fi transmitter device may be used. The wireless communication devices 102A, 102B, 102C may be implemented without Wi-Fi components; for example, other types of standard or non-standard wireless communication may be used for motion detection. In some cases, the wireless communication devices 102A, 102B, 102C can be, or they may be part of, a dedicated motion detection system. For example, the dedicated motion detection system can include a hub device and one or more beacon devices (as remote sensor devices), and the wireless communication devices 102A, 102B, 102C can be either a hub device or a beacon device in the motion detection system.

As shown in FIG. 1, the example wireless communication device 102C includes a modem 112, a processor 114, a memory 116, and a power unit 118; any of the wireless communication devices 102A, 102B, 102C in the wireless communication system 100 may include the same, additional or different components, and the components may be configured to operate as shown in FIG. 1 or in another manner. In some implementations, the modem 112, processor 114, memory 116, and power unit 118 of a wireless communication device are housed together in a common housing or other assembly. In some implementations, one or more of the components of a wireless communication device can be housed separately, for example, in a separate housing or other assembly.

The example modem 112 can communicate (receive, transmit, or both) wireless signals. For example, the modem 112 may be configured to communicate radio frequency (RF) signals formatted according to a wireless communication standard (e.g., Wi-Fi or Bluetooth). The modem 112 may be implemented as the example wireless network modem 112 shown in FIG. 1, or may be implemented in another manner, for example, with other types of components or subsystems. In some implementations, the example modem 112 includes a radio subsystem and a baseband subsystem. In some cases, the baseband subsystem and radio subsystem can be implemented on a common chip or chipset, or they may be implemented in a card or another type of assembled device. The baseband subsystem can be coupled to the radio subsystem, for example, by leads, pins, wires, or other types of connections.

In some cases, a radio subsystem in the modem 112 can include one or more antennas and radio frequency circuitry. The radio frequency circuitry can include, for example, circuitry that filters, amplifies or otherwise conditions analog signals, circuitry that up-converts baseband signals to RF signals, circuitry that down-converts RF signals to baseband signals, etc. Such circuitry may include, for example, filters, amplifiers, mixers, a local oscillator, etc. The radio subsystem can be configured to communicate radio frequency wireless signals on the wireless communication channels. As an example, the radio subsystem may include a radio chip, an RF front end, and one or more antennas. A radio subsystem may include additional or different components. In some implementations, the radio subsystem can be or include the radio electronics (e.g., RF front end, radio chip, or analogous components) from a conventional modem, for example, from a Wi-Fi modem, pico base station modem, etc. In some implementations, the antenna includes multiple antennas.

In some cases, a baseband subsystem in the modem 112 can include, for example, digital electronics configured to process digital baseband data. As an example, the baseband subsystem may include a baseband chip. A baseband subsystem may include additional or different components. In some cases, the baseband subsystem may include a digital signal processor (DSP) device or another type of processor device. In some cases, the baseband system includes digital processing logic to operate the radio subsystem, to communicate wireless network traffic through the radio subsystem, to detect motion based on motion detection signals received through the radio subsystem or to perform other types of processes. For instance, the baseband subsystem may include one or more chips, chipsets, or other types of devices that are configured to encode signals and deliver the encoded signals to the radio subsystem for transmission, or to identify and analyze data encoded in signals from the radio subsystem (e.g., by decoding the signals according to a wireless communication standard, by processing the signals according to a motion detection process, or otherwise).

In some instances, the radio subsystem in the example modem 112 receives baseband signals from the baseband subsystem, up-converts the baseband signals to radio frequency (RF) signals, and wirelessly transmits the radio frequency signals (e.g., through an antenna). In some instances, the radio subsystem in the example modem 112 wirelessly receives radio frequency signals (e.g., through an antenna), down-converts the radio frequency signals to baseband signals, and sends the baseband signals to the baseband subsystem. The signals exchanged between the radio subsystem and the baseband subsystem may be digital or analog signals. In some examples, the baseband subsystem includes conversion circuitry (e.g., a digital-to-analog converter, an analog-to-digital converter) and exchanges analog signals with the radio subsystem. In some examples, the radio subsystem includes conversion circuitry (e.g., a digital-to-analog converter, an analog-to-digital converter) and exchanges digital signals with the baseband subsystem.

In some cases, the baseband subsystem of the example modem 112 can communicate wireless network traffic (e.g., data packets) in the wireless communication network through the radio subsystem on one or more network traffic channels. The baseband subsystem of the modem 112 may also transmit or receive (or both) signals (e.g., motion probe signals or motion detection signals) through the radio subsystem on a dedicated wireless communication channel. In some instances, the baseband subsystem generates motion probe signals for transmission, for example, to probe a space for motion. In some implementations, the motion probe signals include standard signaling or communication frames that include standard pilot signals used in channel sounding (e.g., channel sounding for beamforming according to the IEEE 802.11ac-2013 standard). In some cases, the motion probe signals include reference signals known to all devices in the network. In some instances, the baseband subsystem processes received motion detection signals (signals based on motion probe signals transmitted through the space), for example, to detect motion of an object in a space. For example, the baseband subsystem may analyze aspects of standard signaling protocols (e.g., channel sounding for beamforming according to the IEEE 802.11ac-2013 standard, such as, based on the steering or other matrix generated) to detect changes in the channel as a result of motion in the space.

The example processor 114 can execute instructions, for example, to generate output data based on data inputs. The instructions can include programs, codes, scripts, or other types of data stored in memory. Additionally or alternatively, the instructions can be encoded as pre-programmed or re-programmable logic circuits, logic gates, or other types of hardware or firmware components. The processor 114 may be or include a general-purpose microprocessor, as a specialized co-processor or another type of data processing apparatus. In some cases, the processor 114 performs high level operation of the wireless communication device 102C. For example, the processor 114 may be configured to execute or interpret software, scripts, programs, functions, executables, or other instructions stored in the memory 116. In some implementations, the processor 114 may be included in the modem 112.

The example memory 116 can include computer-readable storage media, for example, a volatile memory device, a non-volatile memory device, or both. The memory 116 can include one or more read-only memory devices, random-access memory devices, buffer memory devices, or a combination of these and other types of memory devices. In some instances, one or more components of the memory can be integrated or otherwise associated with another component of the wireless communication device 102C. The memory 116 may store instructions that are executable by the processor 114. For example, the instructions may include instructions for determining a location of detected motion, such as through one or more of the operations of the example processes 800, 900 of FIGS. 8, 9.

The example power unit 118 provides power to the other components of the wireless communication device 102C. For example, the other components may operate based on electrical power provided by the power unit 118 through a voltage bus or other connection. In some implementations, the power unit 118 includes a battery or a battery system, for example, a rechargeable battery. In some implementations, the power unit 118 includes an adapter (e.g., an AC adapter) that receives an external power signal (from an external source) and coverts the external power signal to an internal power signal conditioned for a component of the wireless communication device 102C. The power unit 118 may include other components or operate in another manner.

In the example shown in FIG. 1, the wireless communication devices 102A, 102B transmit wireless signals (e.g., according to a wireless network standard, a motion detection protocol, or otherwise). For instance, wireless communication devices 102A, 102B may broadcast wireless motion probe signals (e.g., as described above), or they may send wireless signals addressed to other devices (e.g., a user equipment, a client device, a server, etc.), and the other devices (not shown) as well as the wireless communication device 102C may receive the wireless signals transmitted by the wireless communication devices 102A, 102B. In some cases, the wireless signals transmitted by the wireless communication devices 102A, 102B are repeated periodically, for example, according to a wireless communication standard or otherwise.

In the example shown, the wireless communication device 102C processes the wireless signals from the wireless communication devices 102A, 102B to detect motion of an object in a space accessed by the wireless signals, to determine a location of the detected motion, or both. For example, the wireless communication device 102C may perform one or more operations of the example processes described below with respect to FIGS. 3-9, or another type of process for detecting motion or determining a location of detected motion. The space accessed by the wireless signals can be an indoor or outdoor space, which may include, for example, one or more fully or partially enclosed areas, an open area without enclosure, etc. The space can be or can include an interior of a room, multiple rooms, a building, or the like. In some cases, the wireless communication system 100 can be modified, for instance, such that the wireless communication device 102C can transmit wireless signals and the wireless communication devices 102A, 102B can processes the wireless signals from the wireless communication device 102C to detect motion or determine a location of detected motion.

The wireless signals used for motion detection can include, for example, a beacon signal (e.g., Bluetooth Beacons, Wi-Fi Beacons, other wireless beacon signals), pilot signals (e.g., pilot signals used for channel sounding, such as in beamforming applications), or another standard signal generated for other purposes according to a wireless network standard, or non-standard signals (e.g., random signals, reference signals, etc.) generated for motion detection or other purposes. In some examples, the wireless signals propagate through an object (e.g., a wall) before or after interacting with a moving object, which may allow the moving object's movement to be detected without an optical line-of-sight between the moving object and the transmission or receiving hardware. Based on the received signals, the third wireless communication device 102C may generate motion detection data. In some instances, the third wireless communication device 102C may communicate the motion detection data to another device or system, such as a security system, that may include a control center for monitoring movement within a space, such as a room, building, outdoor area, etc.

In some implementations, the wireless communication devices 102A, 102B can be modified to transmit motion probe signals (e.g., as described above) on a separate wireless communication channel (e.g., a frequency channel or coded channel) from wireless network traffic signals. For example, the modulation applied to the payload of a motion probe signal and the type of data or data structure in the payload may be known by the third wireless communication device 102C, which may reduce the amount of processing that the third wireless communication device 102C performs for motion sensing. The header may include additional information such as, for example, an indication of whether motion was detected by another device in the communication system 100, an indication of the modulation type, an identification of the device transmitting the signal, etc.

In the example shown in FIG. 1, the wireless communication system 100 is a wireless mesh network, with wireless communication links between each of the respective wireless communication devices 102. In the example shown, the wireless communication link between the third wireless communication device 102C and the first wireless communication device 102A can be used to probe a first motion detection field 110A, the wireless communication link between the third wireless communication device 102C and the second wireless communication device 102B can be used to probe a second motion detection field 110B, and the wireless communication link between the first wireless communication device 102A and the second wireless communication device 102B can be used to probe a third motion detection field 110C. In some instances, each wireless communication device 102 detects motion in the motion detection fields 110 accessed by that device by processing received signals that are based on wireless signals transmitted by the wireless communication devices 102 through the motion detection fields 110. For example, when the person 106 shown in FIG. 1 moves in the first motion detection field 110A and the third motion detection field 110C, the wireless communication devices 102 may detect the motion based on signals they received that are based on wireless signals transmitted through the respective motion detection fields 110. For instance, the first wireless communication device 102A can detect motion of the person in both motion detection fields 110A, 110C, the second wireless communication device 102B can detect motion of the person 106 in the motion detection field 110C, and the third wireless communication device 102C can detect motion of the person 106 in the motion detection field 110A.

In some instances, the motion detection fields 110 can include, for example, air, solid materials, liquids, or another medium through which wireless electromagnetic signals may propagate. In the example shown in FIG. 1, the first motion detection field 110A provides a wireless communication channel between the first wireless communication device 102A and the third wireless communication device 102C, the second motion detection field 110B provides a wireless communication channel between the second wireless communication device 102B and the third wireless communication device 102C, and the third motion detection field 110C provides a wireless communication channel between the first wireless communication device 102A and the second wireless communication device 102B. In some aspects of operation, wireless signals transmitted on a wireless communication channel (separate from or shared with the wireless communication channel for network traffic) are used to detect movement of an object in a space. The objects can be any type of static or moveable object, and can be living or inanimate. For example, the object can be a human (e.g., the person 106 shown in FIG. 1), an animal, an inorganic object, or another device, apparatus, or assembly), an object that defines all or part of the boundary of a space (e.g., a wall, door, window, etc.), or another type of object. In some implementations, motion information from the wireless communication devices may be analyzed to determine a location of the detected motion. For example, as described further below, one of the wireless communication devices 102 (or another device communicably coupled to the devices 102) may determine that the detected motion is nearby a particular wireless communication device.

FIGS. 2A and 2B are diagrams showing example wireless signals communicated between wireless communication devices 204A, 204B, 204C. The wireless communication devices 204A, 204B, 204C can be, for example, the wireless communication devices 102A, 102B, 102C shown in FIG. 1, or other types of wireless communication devices. The example wireless communication devices 204A, 204B, 204C transmit wireless signals through a space 200. The example space 200 can be completely or partially enclosed or open at one or more boundaries of the space 200. The space 200 can be or can include an interior of a room, multiple rooms, a building, an indoor area, outdoor area, or the like. A first wall 202A, a second wall 202B, and a third wall 202C at least partially enclose the space 200 in the example shown.

In the example shown in FIGS. 2A and 2B, the first wireless communication device 204A is operable to transmit wireless motion probe signals repeatedly (e.g., periodically, intermittently, at scheduled, unscheduled or random intervals, etc.). The second and third wireless communication devices 204B, 204C are operable to receive signals based on the motion probe signals transmitted by the wireless communication device 204A. The motion probe signals may be formatted as described above. For example, in some implementations, the motion probe signals include standard signaling or communication frames that include standard pilot signals used in channel sounding (e.g., channel sounding for beamforming according to the IEEE 802.11ac-2013 standard). The wireless communication devices 204B, 204C each have a modem, processor, or other component that is configured to process received motion detection signals to detect motion of an object in the space 200.

As shown, an object is in a first position 214A in FIG. 2A, and the object has moved to a second position 214B in FIG. 2B. In FIGS. 2A and 2B, the moving object in the space 200 is represented as a human, but the moving object can be another type of object. For example, the moving object can be an animal, an inorganic object (e.g., a system, device, apparatus, or assembly), an object that defines all or part of the boundary of the space 200 (e.g., a wall, door, window, etc.), or another type of object.

As shown in FIGS. 2A and 2B, multiple example paths of the wireless signals transmitted from the first wireless communication device 204A are illustrated by dashed lines. Along a first signal path 216, the wireless signal is transmitted from the first wireless communication device 204A and reflected off the first wall 202A toward the second wireless communication device 204B. Along a second signal path 218, the wireless signal is transmitted from the first wireless communication device 204A and reflected off the second wall 202B and the first wall 202A toward the third wireless communication device 204C. Along a third signal path 220, the wireless signal is transmitted from the first wireless communication device 204A and reflected off the second wall 202B toward the third wireless communication device 204C. Along a fourth signal path 222, the wireless signal is transmitted from the first wireless communication device 204A and reflected off the third wall 202C toward the second wireless communication device 204B.

In FIG. 2A, along a fifth signal path 224A, the wireless signal is transmitted from the first wireless communication device 204A and reflected off the object at the first position 214A toward the third wireless communication device 204C. Between FIGS. 2A and 2B, a surface of the object moves from the first position 214A to a second position 214B in the space 200 (e.g., some distance away from the first position 214A). In FIG. 2B, along a sixth signal path 224B, the wireless signal is transmitted from the first wireless communication device 204A and reflected off the object at the second position 214B toward the third wireless communication device 204C. The sixth signal path 224B depicted in FIG. 2B is longer than the fifth signal path 224A depicted in FIG. 2A due to the movement of the object from the first position 214A to the second position 214B. In some examples, a signal path can be added, removed, or otherwise modified due to movement of an object in a space.

The example wireless signals shown in FIGS. 2A and 2B may experience attenuation, frequency shifts, phase shifts, or other effects through their respective paths and may have portions that propagate in another direction, for example, through the walls 202A, 202B, and 202C. In some examples, the wireless signals are radio frequency (RF) signals. The wireless signals may include other types of signals.

In the example shown in FIGS. 2A and 2B, the first wireless communication device 204A can repeatedly transmit a wireless signal. In particular, FIG. 2A shows the wireless signal being transmitted from the first wireless communication device 204A at a first time, and FIG. 2B shows the same wireless signal being transmitted from the first wireless communication device 204A at a second, later time. The transmitted signal can be transmitted continuously, periodically, at random or intermittent times or the like, or a combination thereof. The transmitted signal can have a number of frequency components in a frequency bandwidth. The transmitted signal can be transmitted from the first wireless communication device 204A in an omnidirectional manner, in a directional manner or otherwise. In the example shown, the wireless signals traverse multiple respective paths in the space 200, and the signal along each path may become attenuated due to path losses, scattering, reflection, or the like and may have a phase or frequency offset.

As shown in FIGS. 2A and 2B, the signals from various paths 216, 218, 220, 222, 224A, and 224B combine at the third wireless communication device 204C and the second wireless communication device 204B to form received signals. Because of the effects of the multiple paths in the space 200 on the transmitted signal, the space 200 may be represented as a transfer function (e.g., a filter) in which the transmitted signal is input and the received signal is output. When an object moves in the space 200, the attenuation or phase offset affected upon a signal in a signal path can change, and hence, the transfer function of the space 200 can change. Assuming the same wireless signal is transmitted from the first wireless communication device 204A, if the transfer function of the space 200 changes, the output of that transfer function—the received signal—will also change. A change in the received signal can be used to detect movement of an object.

Mathematically, a transmitted signal f(t) transmitted from the first wireless communication device 204A may be described according to Equation (1):

$$f(t) = \sum_{n=-\infty}^{\infty} c_n e^{j\omega_n t} \qquad (1)$$

where $\omega_n$ represents the frequency of $n^{th}$ frequency component of the transmitted signal, $c_n$ represents the complex coefficient of the $n^{th}$ frequency component, and t represents time. With the transmitted signal f(t) being transmitted from the first wireless communication device 204A, an output signal $r_k(t)$ from a path k may be described according to Equation (2):

$$r_k(t) = \sum_{n=-\infty}^{\infty} \alpha_{n,k} c_n e^{j(\omega_n t + \phi_{n,k})} \qquad (2)$$

where $\alpha_{n,k}$ represents an attenuation factor (or channel response; e.g., due to scattering, reflection, and path losses) for the $n^{th}$ frequency component along path k, and $\phi_{n,k}$ represents the phase of the signal for $n^{th}$ frequency component along path k. Then, the received signal R at a wireless communication device can be described as the summation of all output signals $r_k(t)$ from all paths to the wireless communication device, which is shown in Equation (3):

$$R = \sum_k r_k(t) \qquad (3)$$

Substituting Equation (2) into Equation (3) renders the following Equation (4):

$$R = \sum_k \sum_{n=-\infty}^{\infty} (\alpha_{n,k} e^{j\phi_{n,k}}) c_n e^{j\omega_n t} \qquad (4)$$

The received signal R at a wireless communication device can then be analyzed. The received signal R at a wireless communication device can be transformed to the frequency domain, for example, using a Fast Fourier Transform (FFT) or another type of algorithm. The transformed signal can represent the received signal R as a series of n complex values, one for each of the respective frequency components (at the n frequencies $\omega_n$). For a frequency component at frequency $\omega_n$, a complex value $H_n$ may be represented as follows in Equation (5):

$$H_n = \sum_k c_n \alpha_{n,k} e^{j\phi_{n,k}}. \qquad (5)$$

The complex value $H_n$ for a given frequency component $\omega_n$ indicates a relative magnitude and phase offset of the received signal at that frequency component $\omega_n$. In some implementations, the complex value $H_n$ represents a frequency component of a frequency response signal H that is based on the received signal R. When an object moves in the space, the complex value $H_n$ changes due to the channel response $\alpha_{n,k}$ of the space changing. Accordingly, a change detected in the channel response (and thus, the frequency response signal H) can be indicative of movement of an object within the communication channel. In some instances, noise, interference or other phenomena can influence the channel response detected by the receiver, and the motion detection system can reduce or isolate such influences to improve the accuracy and quality of motion detection capabilities. In some implementations, the overall channel response can be represented as:

$$h_{ch} = \sum_k \sum_{n=-\infty}^{\infty} \alpha_{n,k}. \qquad (6)$$

In some instances, the channel response $h_{ch}$ for a space can be determined, for example, based on the mathematical theory of estimation. For instance, a reference signal $R_{ef}$ can be modified with candidate channel responses ($h_{ch}$), and then a maximum likelihood approach can be used to select the candidate channel which gives best match to the received signal ($R_{cvd}$). In some cases, an estimated received signal ($\hat{R}_{cvd}$) is obtained from the convolution of the reference signal ($R_{ef}$) with the candidate channel responses ($h_{ch}$), and then the channel coefficients of the channel response ($h_{ch}$) are varied to minimize the squared error of the estimated received signal ($\hat{R}_{cvd}$). This can be mathematically illustrated as:

$$\hat{R}_{cvd} = R_{ef} \otimes h_{ch} = \sum_{k=-m}^{m} R_{ef}(n-k) h_{ch}(k) \qquad (7)$$

with the optimization criterion $$\min_{h_{ch}} \sum (\hat{R}_{cvd} - R_{cvd})^2. \qquad (8)$$

The minimizing, or optimizing, process can utilize an adaptive filtering technique, such as Least Mean Squares (LMS), Recursive Least Squares (RLS), Batch Least Squares (BLS), etc. The channel response can be a Finite Impulse Response (FIR) filter, Infinite Impulse Response (IIR) filter, or the like.

As shown in the equation above, the received signal can be considered as a convolution of the reference signal and the channel response. The convolution operation means that the channel coefficients possess a degree of correlation with each of the delayed replicas of the reference signal. The convolution operation as shown in the equation above, therefore shows that the received signal appears at different delay points, each delayed replica being weighted by the channel coefficient.

In some aspects, a signal quality metric may be determined for received signals based on the channel response. For example, a determined channel response ($h_{ch}$) for a space may be applied to a reference signal ($R_{ef}$) to yield an estimated received signal ($\hat{R}_{cvd}$), which is an estimation of what the received signal should be based on the channel response (e.g., based on convolution of the reference signal ($R_{ef}$) with the channel response ($h_{ch}$) as described above). The estimated received signal ($\hat{R}_{cvd}$) and the actual received signal ($R_{cvd}$) may be used to compute a signal quality metric. In some examples, for instance, the signal quality metric is based on (e.g., is set equal to, is computed from, is representative of, etc.) a value Q that is determined by computing the dot product of the actual received signal ($R_{cvd}$) and the difference between the estimated received signal ($\hat{R}_{cvd}$) and the actual received signal ($R_{cvd}$), e.g.:

$$Q = R_{cvd} \cdot (\hat{R}_{cvd} - R_{cvd}). \tag{9}$$

The signal quality metric may be determined using other calculations. In some cases, for example, the absolute value or magnitude of the dot product or another computed value is used as a signal quality metric for the received signal. In some cases, the signal quality metric is a correlation index, or another type of signal quality metric. In some cases, the signal quality metric is determined based on a signal-to-noise ratio (SNR) of the received signals.

In some cases, received signals may be "rejected" by a wireless communication device. For example, in some implementations, a motion detection process may include quality criterion for signals used in the motion detection process. Signals that do not meet the quality criterion may be rejected (e.g., discarded or ignored) and not considered in determining whether motion has occurred in the space 300. The signals may be accepted or rejected as inputs to the motion detection process based on the signal quality metric (e.g., the value Q described by Equation (9)). For instance, in some cases, a motion detection process uses only a subset of received signals that have values Q above a certain threshold.

In some examples, transmitted and received signals are in an RF spectrum, and signals are analyzed in a baseband bandwidth. For example, a transmitted signal may include a baseband signal that has been up-converted to define a transmitted RF signal, and a received signal may include a received RF signal that has been down-converted to a baseband signal. Because the received baseband signal is embedded in the received RF signal, effects of movement in the space (e.g., a change in a transfer function) may occur on the received baseband signal, and the baseband signal may be the signal that is processed (e.g., using a Fourier analysis or another type of analysis) to detect movement. In other examples, the processed signal may be an RF signal or another signal.

In some implementations, statistical parameters may be determined for received wireless signals. The statistical parameters may describe a characteristic of the signals, and may be based on a function applied to frequency components of a frequency domain representation of the received wireless signals. In some instances, the statistical parameter includes one or more of at least one of the maximum, minimum, mean, or standard deviation of one or more frequency components of the received signals. For instance, in some implementations, a frequency response signal H based on the received signal R at a wireless communication device is represented by the vector $$\vec{H}_j = (h_{1,j}, h_{2,j}, h_{3,j}, \ldots, h_{n,j}). \tag{10}$$

The elements of the vector $\vec{H}_j$ are frequency components for respective frequency values $\omega_1, \omega_2, \omega_3, \ldots, \omega_n$ at a time point j. The frequency components $h_{i,j}$ may be complex values, in some cases. Functions can be defined and applied to the frequency response signal H or to certain frequency components $h_{i,j}$ of the frequency response signal to yield statistical parameters that describe characteristics of the frequency response signal. The statistical parameter can be computed, for example, based on a statistical function or other type of mathematical function that indicates a characteristic of the frequency response signal. A function can then be applied to the vector $\vec{H}_j$ (or elements thereof) to yield values of one or more statistical parameters for the respective time segments. For example, the statistical parameter may be based on a function that determines a mean, such as, for example, according to the mean value function $$\text{mean}_j = \frac{\sum_{i=1}^{n} |h_{i,j}|}{N} \tag{11}$$

where N is the number of frequency components or elements of $\vec{H}_j$. As another example, the statistical parameter may be based on a function that determines a standard deviation, such as, for example, according to the standard deviation function:

$$std_j = \sqrt{\frac{\sum_{i=1}^{n} (|h_{i,j}| - \text{mean})^2}{N-1}} \tag{12}$$

where N is the number of frequency components or elements of $\vec{H}_j$.

In some cases, motion, distinct categories of motion, or a location of detected motion can be detected based on the statistical parameter values. For example, groupings of the statistical parameter values may be identified and analyzed as described below to detect whether a channel perturbation has occurred in a space, what type of channel perturbation has occurred (e.g., interference versus motion of an object), and a location of the channel perturbation in the space (e.g., relative to a wireless communication device). In some instances, machine learning may be used to identify patterns in or groupings of the statistical parameter values. For example, statistical parameter values may be passed through a neural network (e.g., the GOOGLE CLOUD ML platform) to learn distinct patterns in the statistical parameter values or other values based on the statistical parameter values (e.g., check values or motion signature values as described further below).

Figure 3:
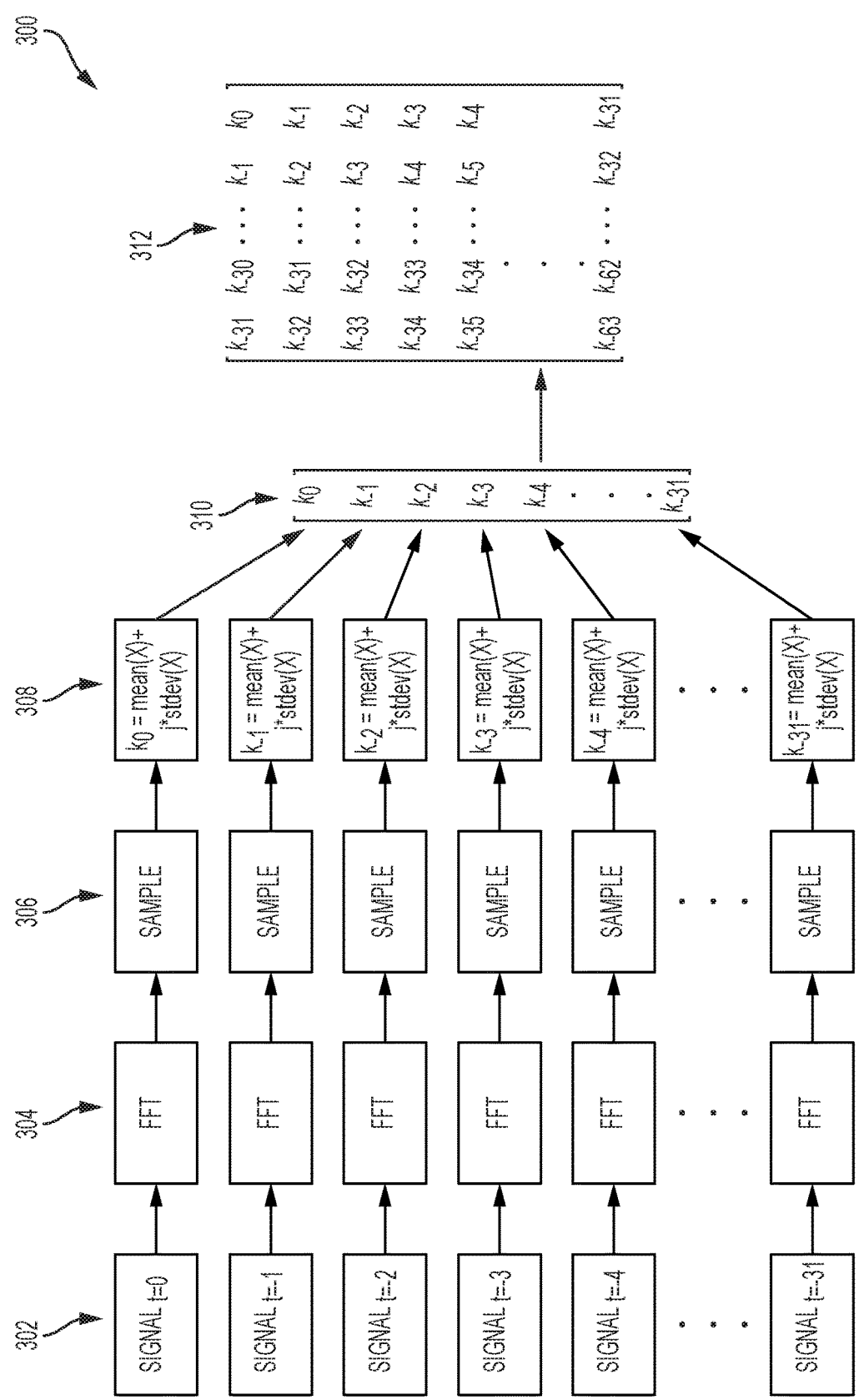
FIG. 3 is a diagram showing an example process of generating a matrix of statistical parameters based on signals received at a wireless communication device.

FIG. 3 is a diagram showing an example process 300 of generating a matrix 312 of statistical parameters based on wireless signals 302 received at a wireless communication device. In the example shown, the signals 302 are received over a time period t={0, 31} by a wireless communication device in a wireless communication system (e.g., the wireless communication device 102C of FIG. 1 or the wireless communication devices 204B, 204C of FIG. 2). The signals 302 may be an analog representation of the wireless signals received at the wireless communication device. For example, the signals 302 may include an output of the radio subsystem of the wireless communication device. In some implementations, the signals 302 analyzed in the process 300 may only include those signals that have been accepted as inputs to the process. For instance, the signals 302 may be compared with one or more quality criteria (e.g., a signal quality metric threshold) to determine whether to further process the signals 302.

In the example shown, the signals 302 are transformed into a frequency domain representation by operation of a fast Fourier transform (FFT) operation 304, which produces an output that includes frequency components of the signals 302. For example, in some cases, the signals 302 may have a bandwidth of approximately 22 MHz, and the FFT operation may use a bandwidth of 88 MHz (based on an oversampling rate of 4) to produce 64 frequency components of the signals 302. The output of the FFT operation 304 is then sampled by a sampling operation 306. In some implementations, the sampling operation selects a subset of the frequency components output by the FFT operation 304. For instance, using the example above where the FFT operation 304 outputs 64 frequency components, the sampling operation 306 may select eight (8) frequency components that are centered around ω=0 (four (4) frequency components with ω<0, and four (4) frequency components with ω>0).

Statistical parameter values are then determined based on frequency components of the signals 302. For instance, in the example shown, mean and standard deviation values of the sampled frequency components of the signal 302 at time t are computed, and a complex value 308 ($k$) is generated based on the mean and standard deviation. The mean and standard deviation may be computed based on the magnitudes of the respective sampled frequency components. For instance, referring to the example above, the mean may be computed by determining the average of the sampled frequency component magnitudes at time t and the standard deviation may be computed by determining a variance of the sampled frequency component magnitudes around the mean at time t. In some cases, such as the example shown in FIG. 3, the real component of the complex value 308 includes the computed mean value and the imaginary component of the complex value 308 includes the computed standard deviation value.

Arrays are generated based on the complex values determined for consecutively-processed signals. For instance, in the example shown, the array 310 includes the 32 complex values 308 determined for times t={0, 31}. Other arrays are also generated based on the latest set of complex values, where the complex values are processed in a first-in/first-out fashion. For example, a second array would include the 32 complex values determined for times t={1, 32}, a third array would include the 32 complex values determined for times t={2, 33}, and so forth until an array is determined for the 32 complex values 308 determined for times t={31, 63}. The matrix 312 is then generated based on the arrays 310. For instance, in the example shown the matrix 312 is generated by making the first array for times t={0, 31} the right-most column, the second array for times t={1, 32} into the second column from the right, and so forth until the left-most column is the array for times t={31, 63} as shown in FIG. 3. The matrix 312 may be considered to be an autocorrelation matrix or a Toeplitz matrix, in some instances. The matrix 312 may be formatted in another manner.

Figure 4:
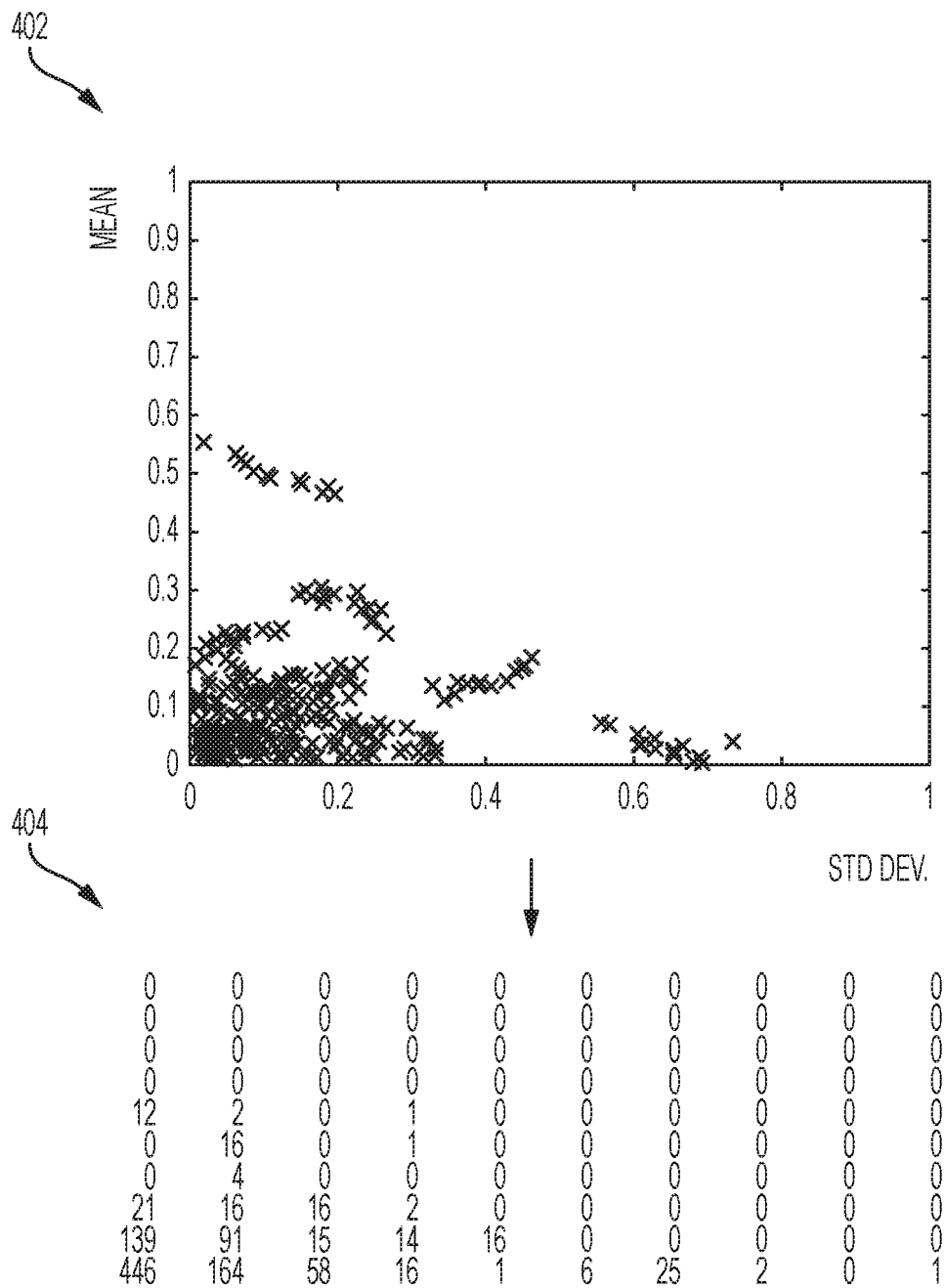
FIG. 4 is a diagram showing an example plot and example histogram data based on the matrix generated in FIG. 3.

FIG. 4 is a diagram showing an example plot 402 and example histogram data 404 based on the matrix 312 generated in FIG. 3. Each data point of the example plot 402 represents an element in the matrix 312. In particular, each data point of the example plot 402 represents values for the standard deviation according to Equation (12) on the horizontal axis and the mean according to Equation (11) on the vertical axis. Thus, the horizontal axis represents the imaginary portion of the complex values kin the matrix 312, and the vertical axis represents the real portion of the complex values kin the matrix 312. In the example plot 402, each data point value is normalized to values between negative one (−1) and one (1) based the equation:

$$H \text{ matrix Normalized}(x_i) = 2 * \left(\frac{x_i}{\max(X)} - 0.5\right) \quad (13)$$

where $x_i$ represents a particular value in the set of values $X=(x_1, x_2, x_3 \ldots x_n)$ for i=1 to n.

The histogram data 404 may be generated based on a binning of the statistical parameter values in the matrix 312. For instance, the histogram data 404 may include a set of bins based on the range of statistical parameter values (e.g., a first bin for the range 0-0.1, a second bin for the range 0.1-0.2, etc.) and a quantity of data points that fall within the respective range for each bin. In some instances, such as the example shown in FIG. 4, the histogram data 404 may be represented in matrix form. For instance, the example histogram data 404 is a 10×10 matrix whose elements represent a quantity of data points falling within the respective bins defined by 0.1 increments of the statistical parameter values. As an example, the lower left element of the histogram data 404 indicates that there are 446 data points whose mean and standard deviation values are between 0 and 0.1. The histogram data 404 may be generated in another manner. In some implementations, the histogram data 404 is used to detect channel perturbations in a space, such as, for example, as described further below.

Figure 5A:
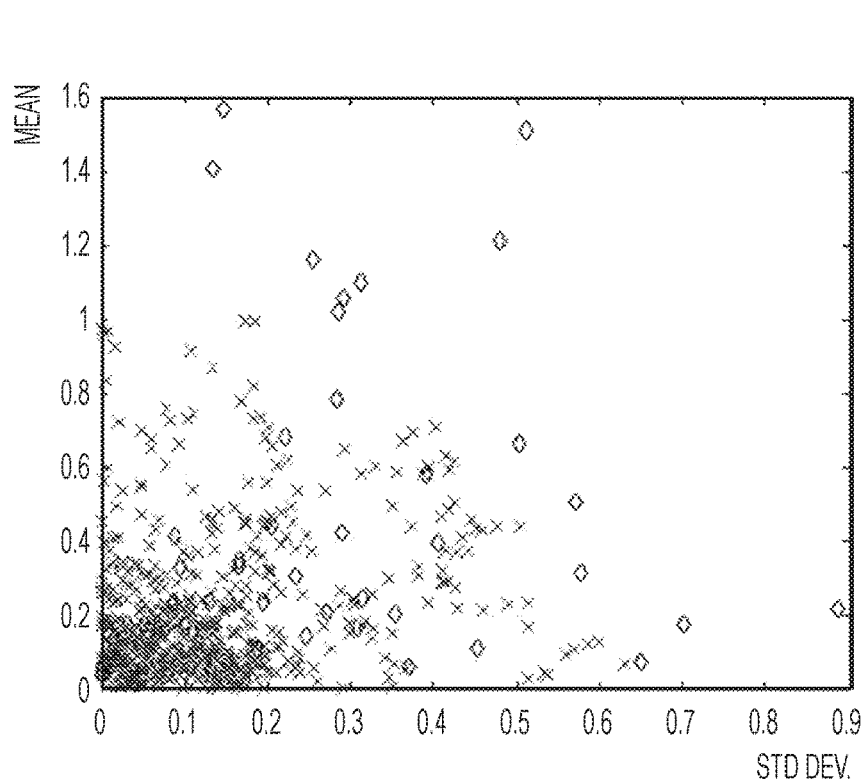
FIGS. 5A-5F are example plots of statistical parameter values for wireless signals associated with different categories of motion.
Figure 5B:
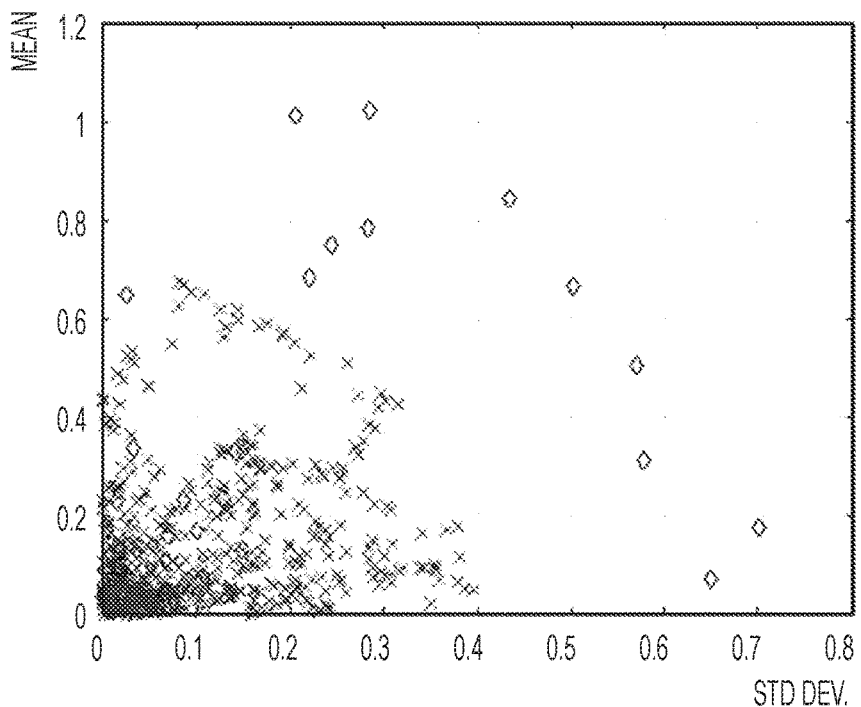
Figure 5C:
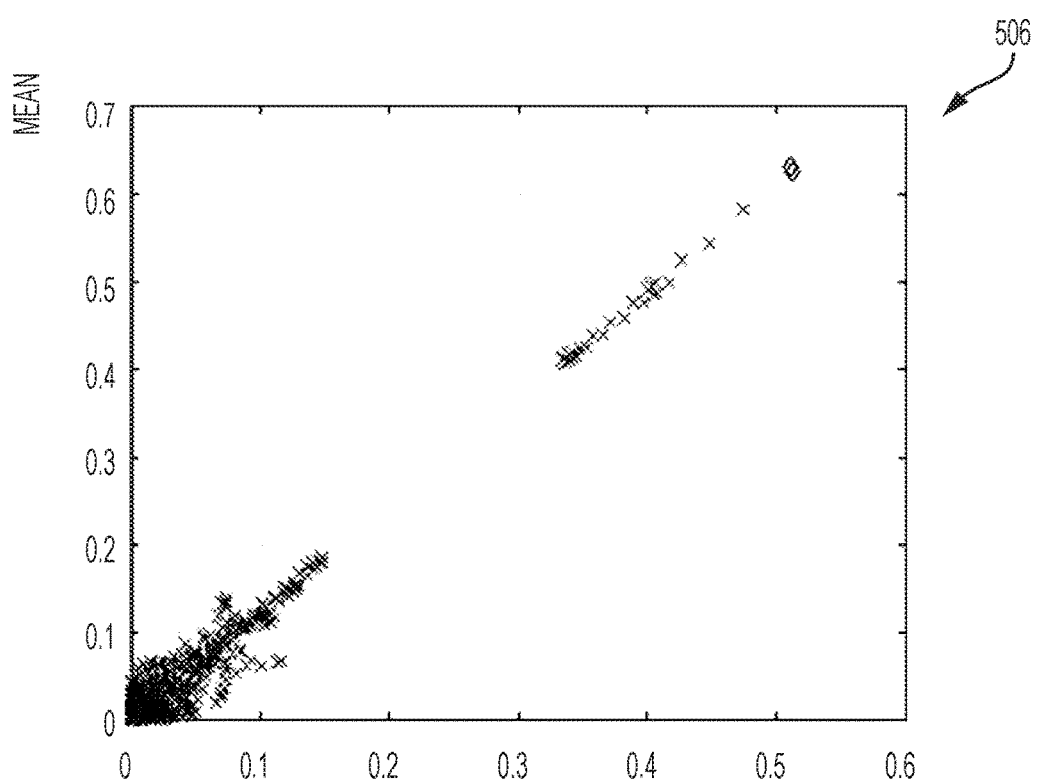
Figure 5D:
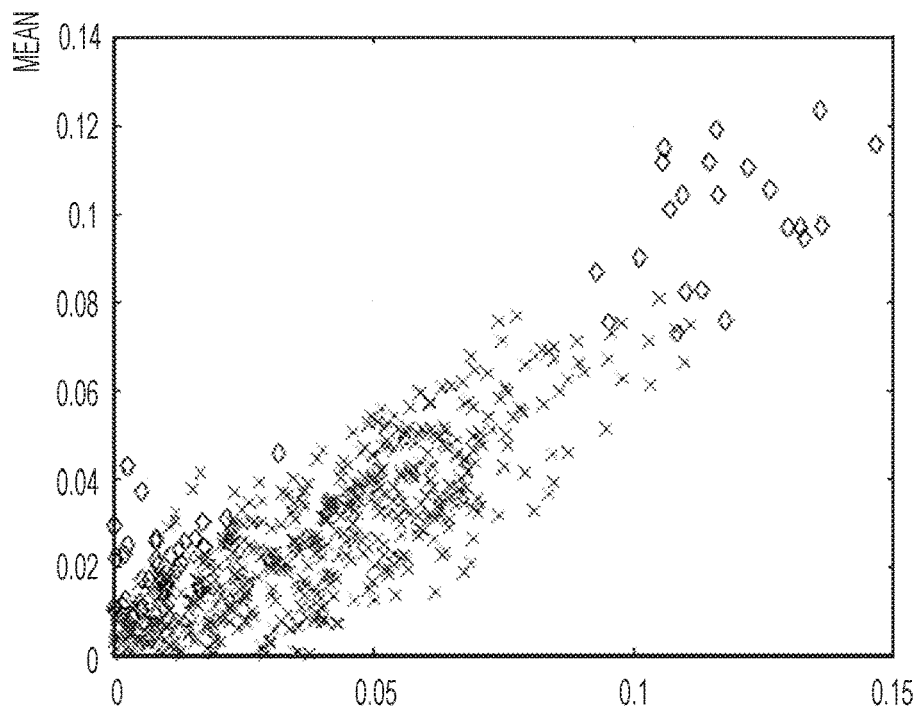
Figure 5E:
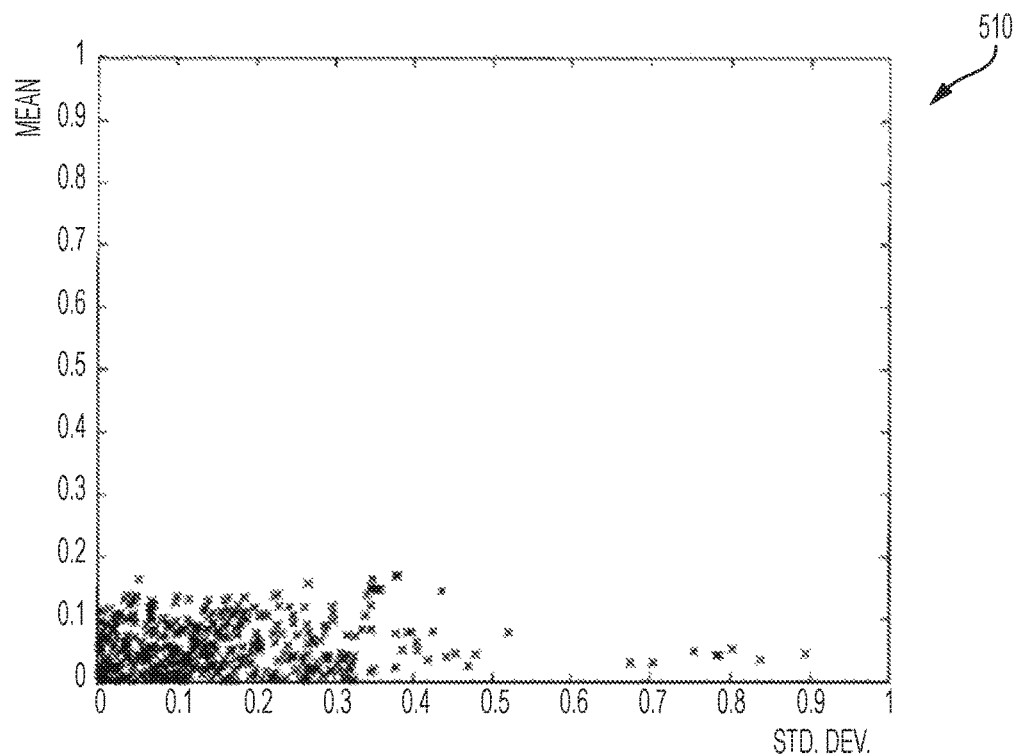
Figure 5F:
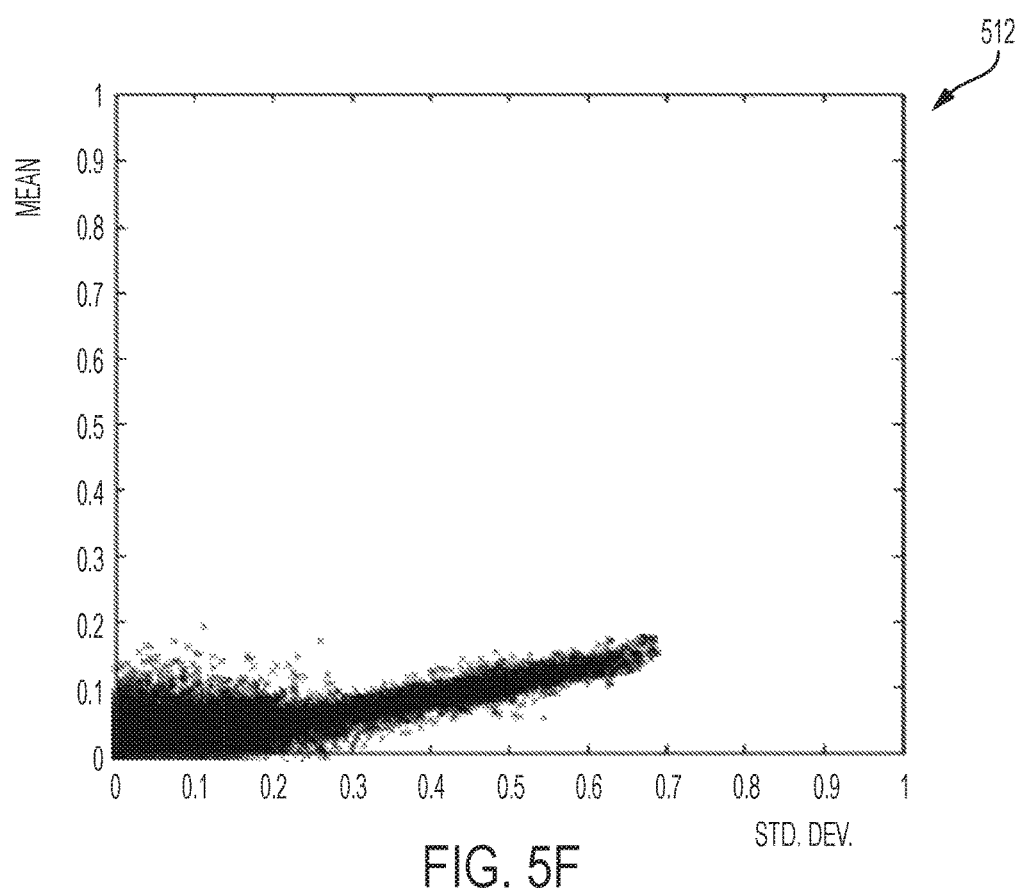

FIGS. 5A-5F are example plots of statistical parameter values for wireless signals associated with different categories of motion. The example plots of FIGS. 5A-5F are formatted in the same manner as the plot 402 of FIG. 4. The data points in each example plot are determined from wireless signals transmitted through a space during different respective time periods. In particular, the plot 502 of FIG. 5A shows statistical parameter values for wireless signals transmitted through a space during a first time period, the plot 504 of FIG. 5B shows statistical parameter values for wireless signals transmitted through the space during a second time period, the plot 506 of FIG. 5C shows statistical parameter values for wireless signals transmitted through the space during a third time period, the plot 508 of FIG. 5D shows statistical parameter values for wireless signals transmitted through the space during a fourth time period, the plot 510 of FIG. 5E shows statistical parameter values for wireless signals transmitted through the space during a fifth time period, and the plot 512 of FIG. 5F shows statistical parameter values for wireless signals transmitted through the space during a sixth time period.

FIGS. 5A, 5B show plots 502, 504 relating to motion of a human (e.g., the person 106 in FIG. 1) in the space. In the examples shown in FIGS. 5A, 5B, the data points are distributed non-uniformly and have a relatively large range and distribution of mean and standard deviation values, which may indicate motion of a human (e.g., as compared with the plots of FIGS. SC-5F). In addition, the mean and standard deviation values for the data points in plots 502, 504 have a relatively low correlation with one another.

FIGS. SC, SD show plots 506, 508 relating to interference in the space without motion. In the example shown in FIGS. SC, SD, the data points are distributed diagonally, with the values of mean and standard deviation being approximately equal to one another for each data point. Thus, the mean and standard deviation values are generally correlated (e.g., the data points are generally distributed around a best fit line having a slope=1) as compared with the plots 502, 504.

FIG. 5E shows a plot 510 relating to motion of an animal in the space. In the example shown in FIG. 5E, the data points are distributed similar to the data points in the plots 502, 504 of FIGS. SA, SB, but generally have mean values certain threshold (e.g., below the mean value of 0.3 as shown in FIG. 5E). The mean and standard deviation values for the data points 405 have a relatively low correlation with one another.

FIG. 5F shows a plot 512 relating to motion of an electrical fan in a space. In the example shown in FIG. 5F, the data points have a relatively low mean value and are distributed across a wide range of standard deviation values. In addition, the mean and standard deviation values have a relatively high correlation with one another as compared with the plots 502, 504, 512.

In some implementations, plots such as those shown in FIGS. 5A-5F, the underlying data of the plots, or data associated with the underlying data of the plots (e.g., histogram data) may be input to a neural network training system to train a neural network to detect whether a certain category of motion (e.g., motion by a human) has occurred in the space. For example, the plots (or data associated with the plots) may be "tagged" according to known states for the respective time periods covered by the plots. For instance, histogram data associated with the plots 502, 504 may be tagged as being associated with motion by a human in the space based on a learning phase. For example, a user moving in the space during a learning phase may indicate (e.g., through a user interface on a mobile computing device) that he/she is moving, and the data collected while the user is moving (e.g., the data associated with the plots 502, 504) may be tagged with an indication that motion occurred in the space over the respective time period covered by the collected data. Data associated with other categories of motion (e.g., motion by an animal or electric fan), interference, or with no motion may be tagged in a similar manner during a learning phase. After training the neural network system with the tagged data, newly collected data may be input to the neural network system to detect whether motion (or a distinct category of motion) has occurred in the space (e.g., based on patterns in the plots or data. In some instances, for example, the systems 600, 700 of FIGS. 6, 7 may be used.

Figure 6:
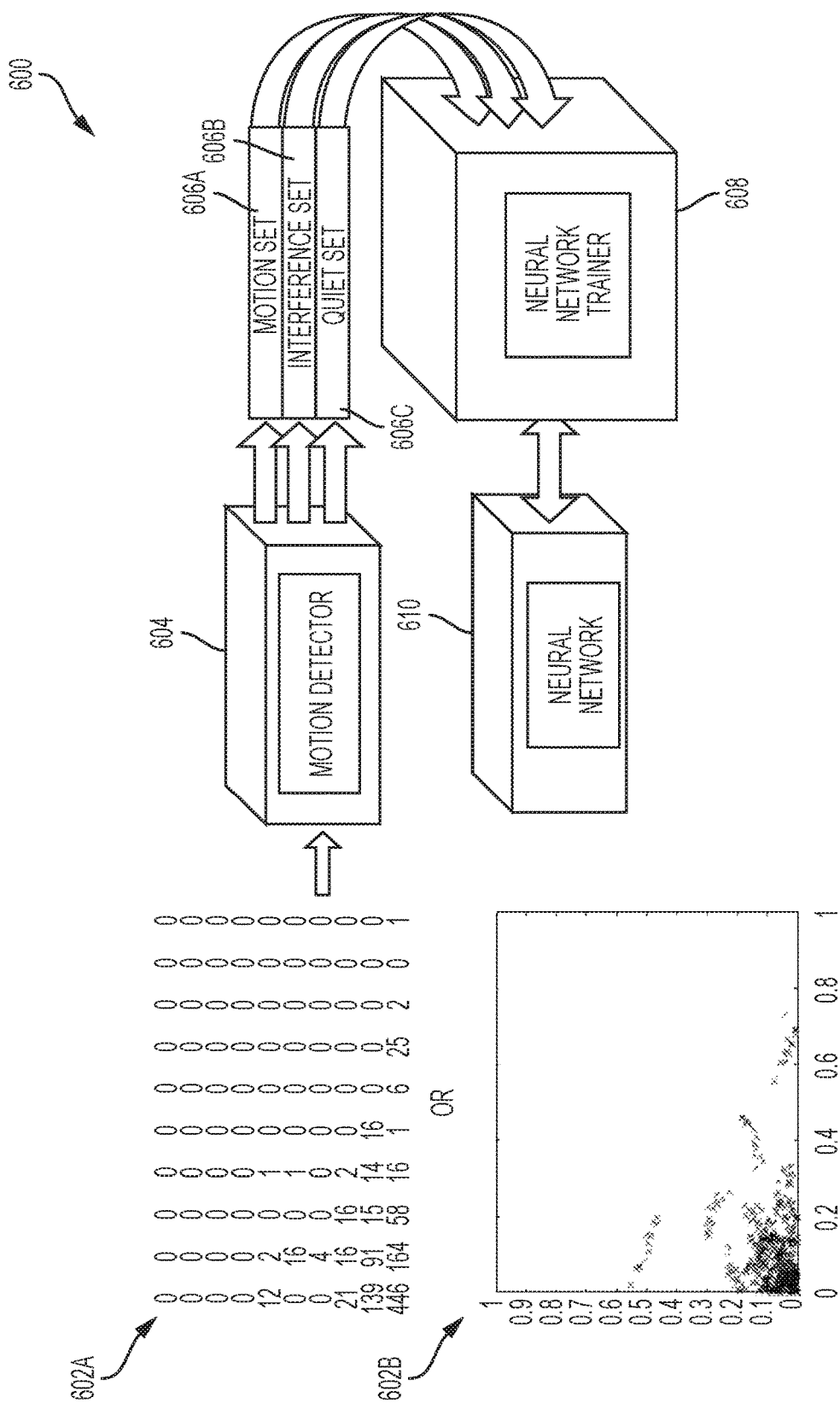
FIG. 6 is a diagram showing an example system for training a neural network 610 to detect motion in a space.

FIG. 6 is a diagram showing an example system 600 for training a neural network 610 to detect motion in a space. In the example shown, the system takes sets of input data 602 and detects, using a motion detector 604, whether motion has occurred in a space traversed by wireless signals (upon which the data 602 is based). In some implementations, each set of input data 602 is based on a statistical analysis of a series of wireless signals transmitted through a space over a respective time period. For example, the input data 602 may be based on statistical parameters for received wireless signals (e.g., as described above with respect to FIG. 3). The input data 602 may include histogram data 602A in some cases, or may include an image 602B of the statistical parameter values plotted against one or more axes.

The motion detector 604 analyzes the input data 602 (e.g., either histogram data 602A or plot images 602B) to categorize the input data 602. In the example shown, for instance, the motion detector 604 categorizes the input data 602 into the categories of: motion detected, interference (no motion) detected, and quiet (no motion or interference). In some implementations, the motion detector 604 categorizes the input data 602 by analyzing a matrix representation of the histogram data 602. For example, row and column operators may determine the sum of the elements in each respective row of a histogram data matrix, or the sum of the elements in each respective column of the histogram data matrix, respectively. The row and column operators may be used to determine check values, including a balance value based on the equation $$\text{Balance} = \frac{\sum CO(2 \to N) - \sum RO(2 \to N)}{\sum CO(2 \to N) + \sum RO(2 \to N)} \tag{14}$$

where CO represents the column operator described above and RO represents the row operator described above. The balance value may be compared with a threshold to determine whether motion has occurred in the space. Other check values may be determined by the motion detector 604. In some implementations, the motion detector 604 categorizes the input data 602 based on a learning phase as described above. The motion detector 604 may categorize the input data 602 in another manner. The motion detector 604 then outputs tagged data sets 606 (indicating the determined category), which are input to a neural network trainer 608. In some cases, the tagged data sets 606 may be filtered for false-positive detections or false-negative detections before being input to the neural network trainer 608.

The neural network trainer 608 processes the sets of tagged input data to parameterize nodes of the neural network 610 to detect motion based on untagged neural network input data. In some cases, for example, the neural network trainer 608 may determine weights and a bias for each node according to a cost function minimization operation, and each node in a layer may weight and bias its inputs according to the determined weights. For instance, a node may provide an output according to $$a_{i+1} = b + \sum_j w_{i,j} a_{i,j} \tag{14}$$

where $a_{i+1}$ refers to the output of the node, b refers to the bias the node provides, $w_i$ refers to the weight applied to an output from a node of a previous layer $a_{i,j}$. The cost functions to be minimized may include:

$$C = -\frac{1}{n} \sum_i \sum_j [y_{j(i)} * \ln(a_{j(i)}^L) + (1 - y_{j(i)}) * \ln(1 - a_{j(i)}^L)]. \tag{15.a}$$

-continued $$C = -\frac{1}{n}\sum_i\sum_j\left[x^i\left(1\{y_{j(i)} = a^L_{j(i)}\} - \frac{e^{a^L_{j(i)}}}{\sum_j e^{a^L_{j(i)}}}\right)\right].$$ (15.b)

where $x^i$ is the $i^{th}$ tagged input to neuron j of layer L. Equation (15.a) is the cost function for sigmoid activation and Equation (15.b) is the cost function for soft-max activation. In equation (15.b) the curly brackets define the binary result of whether the output of the node matches the theoretical output, with a matching result providing an output of one (1), otherwise zero (0).

The cost function C may be minimized using a gradient of decent methodology. For instance, the gradients of decent may be $$\frac{\partial C}{\partial w_j} = \frac{1}{n}\sum_x x_j(\sigma(z) - y)$$ (16)

and $$\frac{\partial C}{\partial b} = \frac{1}{n}\sum_x (\sigma(z) - y)$$ (17)

where σ(z) represents the Sigmoid function or Rectified Linear Unit (ReLU)

$$S(x) = \frac{e^x}{e^x + 1}.$$ (18.a)

$$ReLU(x) = \max(0, x)$$ (18.b)

In some instances, the weights may be initialized to have a normal distribution after iterations of gradient of decent-based training. In some implementations, the tagged input data is processed by the neural network trainer 608 to determine output values based on a current set of weights. A ground truth can then be used with the output values to back propagate error and compute the gradient of decent according to the above equations.

In some implementations, the neural network 610 includes a convolutional neural network that includes multiple layers. For example, the neural network 610 may include multiple convolutional layers, a max-pooling layer after at least one of the convolutional layers, a flattening layer after the max-pooling layer, and multiple dense (fully-connected) layers after the flattening layer. As one example, the neural network 610 may be configured with two convolutional layers, a max-pooling layer after the two convolutional layers, a third convolutional layer after the max-pooling layer, a flattening layer after the third convolutional layer, and four dense layers. In some implementations, the neural network 610 is formatted similar to the CNN 704 of FIG. 7B.

Figure 7A:
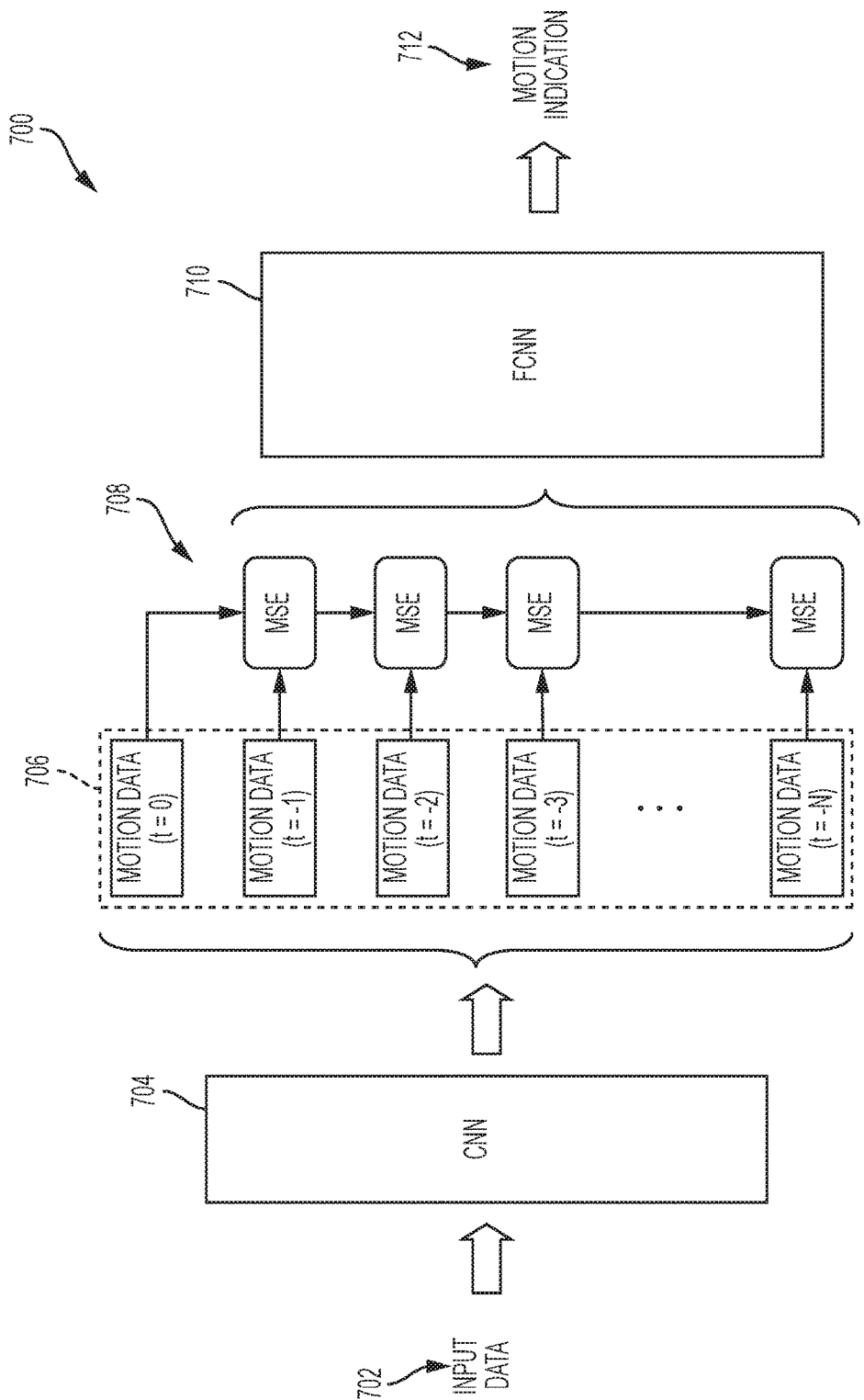
FIGS. 7A and 7B are diagrams showing an example neural network system for detecting motion in a space using untagged data.
Figure 7B:
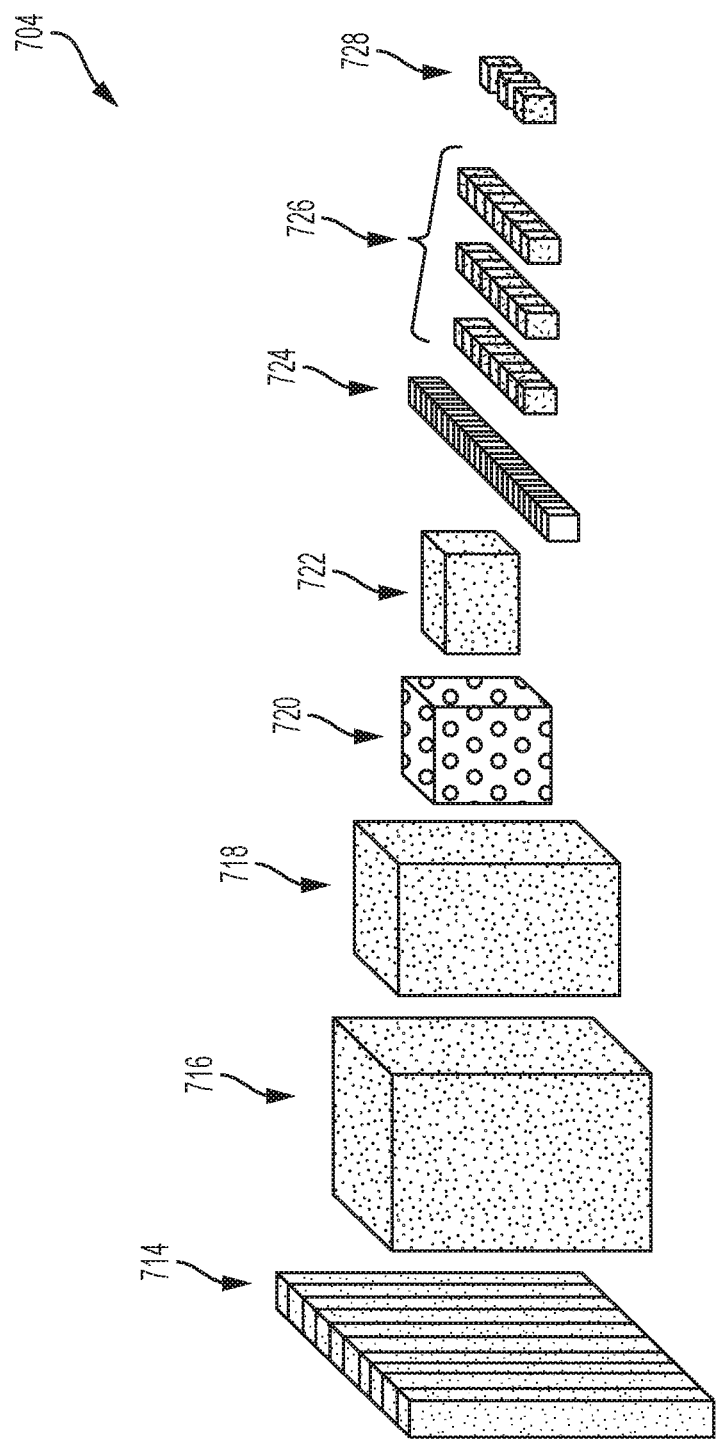

FIGS. 7A and 7B are diagrams showing an example neural network system 700 for detecting motion in a space using untagged data. In the example shown, the neural network system 700 includes a convolutional neural network (CNN) 704 and a fully-connected neural network (FCNN) 710. The CNN 704 may be trained and configured as described above with regard to the neural network 610 of FIG. 6, or in another manner. The FCNN 710 may be configured as a deep, multi-layer neural network of dense layers (where each node of a layer is connected to each node of an adjacent (previous or next) layer). In some implementations, for example, the FCNN 710 is configured with three or more (e.g., five) dense layers. As one example, the first (input) layer of the FCNN 710 may include N nodes, each intermediate layer may include N nodes, and the output layer may include one (1) node. The final layer node may have a sigmoid activation function that delivers the final result. The result may include a fractional value between zero (0) and one (1). A threshold may then be applied to the result to convert it into either zero (0) or one (1) (e.g., a determination of motion vs. no motion). In some cases, the threshold may be 0.5 or 50%.

In the example shown, sets of input data 702 are received at the CNN 704. Each set of input data 702 may include data that is a result of on a statistical analysis of a series of received wireless signals (e.g., as described above with respect to FIGS. 3-4). In some implementations, the input data includes histogram data similar to the data histogram 602A of FIG. 6, image data similar to the image data 602B of FIG. 6, or another type of data that is based on the statistical analysis. The CNN 704 is trained to provide an output that indicates whether motion has occurred in a space traversed by the wireless signals based on the input data 702. In the example shown, the CNN 704 provides the input data determined to be associated with motion ("motion data") in the space into a buffer 706, which stores the most recent set of motion data along with the previous N sets of motion data. In the example shown, the most recent motion data (t=0) is compared with the previous N sets of motion data to determine respective mean square error (MSE) values 708. The MSE values 708 are provided to the FCNN 710, which in turn provides a motion indication 712 based on the MSE values 708. The motion indication 712 may include an indication that motion has occurred in the space, a category of the motion detected (e.g., motion by a human, motion by an animal, motion by an electric fan), an indication of interference in the space, an indication of a quiet state, or another type of indication.

FIG. 7B shows an example configuration of the CNN 704. In the example shown, the CNN 704 includes an input layer 714, convolutional layers 716 and 718, a max-pooling layer 720, another convolutional layer 722 following the max-pooling layer 720, a flattening layer 724, a fully-connected layer 726 (that includes three (3) or more dense layers), and a final soft-max layer 728. The input layer 714 initially processes an image (e.g., an image of a plot of statistical parameter values such as the plot 402 of FIG. 4) or other data that is input to the CNN 704 for processing. The two convolutional layers 716, 718 identify basic shape tokens in the input (e.g., dots and lines in an image), and the max-pooling layer 720 down-samples the feature maps of the convolutional layers 716, 718 (which are a three-dimensional volume). The following convolutional layer 722 can extract the most active complex features (e.g., round curves, sharp edge etc. in an image) after the max-pooling layer 720. The three-dimensional volume may then be flattened by the flattening layer 724 and connected with three dense layers in the fully-connected layer 726 to allow non-linear categorical features to be learned. The dense layers may be capable of understanding the relationship of all the features generated from the convolutional layers to the final output of the soft-max layer 728. In some implementations, the convolutional layer 716 has a dimension of 9×9×2 nodes, the convolutional layer 718 has a dimension of 8×8×4 nodes, the max-pooling layer 720 has a dimension of 4×4×4 nodes, the convolutional layer 722 has a dimension of 3×3×8 nodes, the flattening layer 724 has a dimension of 72×1 nodes, each dense layer of the fully-connected layer 726 has 8 nodes, and the soft-max layer 728 has 3 nodes.

Figure 8:
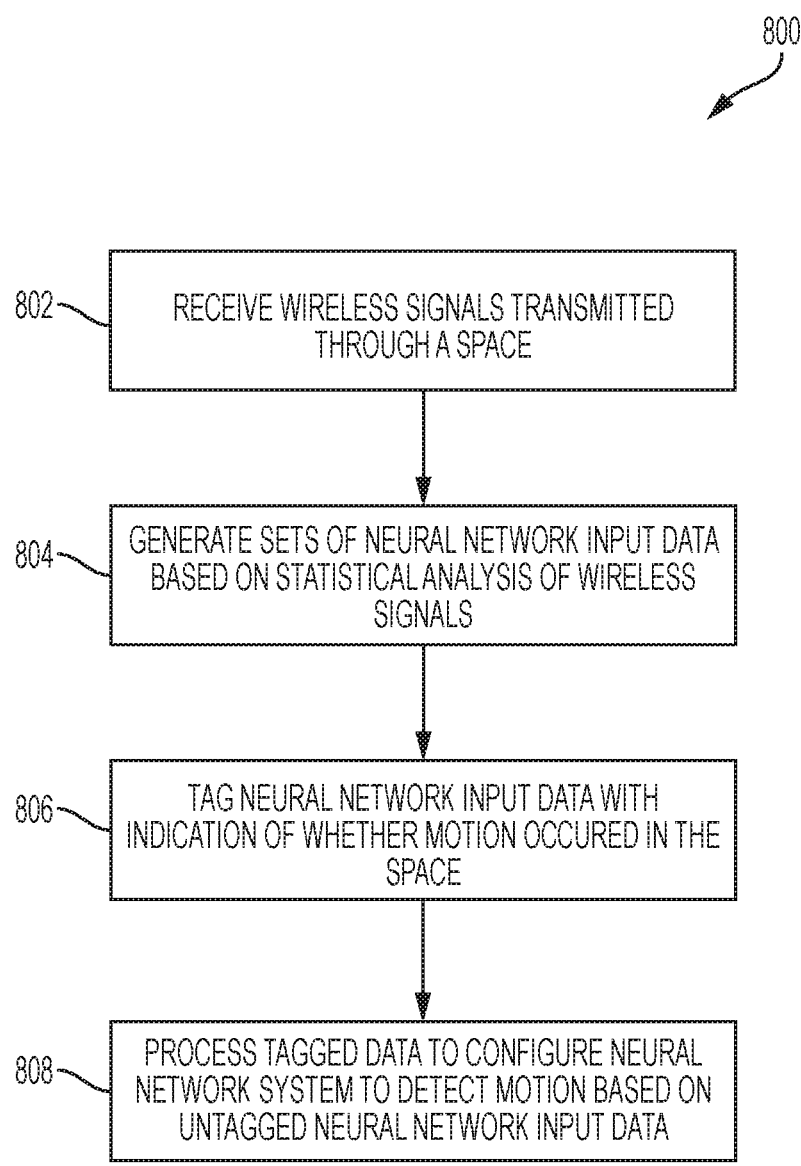
FIG. 8 is a flow diagram showing an example process for training a neural network to detect motion of an object in a space.

FIG. 8 is a flow diagram showing an example process 800 for training and using a neural network to detect motion of an object in a space. For instance, operations in the example process 800 may be performed by the processor subsystem 114 of the example wireless communication devices 102 in FIG. 1 to identify patterns, signatures, or other characteristics of input data that is based on statistical parameters of wireless signals received by wireless communication devices, and associate the patterns or characteristics in a neural network with motion in a space traversed by the wireless signals. The example process 800 may be performed by another type of device. The example process 800 may include additional or different operations, and the operations may be performed in the order shown or in another order. In some cases, one or more of the operations shown in FIG. 8 are implemented as processes that include multiple operations, sub-processes or other types of routines. In some cases, operations can be combined, performed in another order, performed in parallel, iterated, or otherwise repeated or performed another manner.

At 802, wireless signals transmitted through a space are received at a wireless communication device. The wireless signals may be radio frequency (RF) signals, and may include reference, beacon, or pilot signals used to determine changes in the RF channel, and detect whether motion has occurred in the space based on the changes. In some cases, the wireless signals are formatted according to a standard (e.g., channel sounding signals according to the IEEE 802.11-2013 standard). The wireless signals may be formatted in another manner.

At 804, sets of neural network input data are generated based on a statistical analysis of the wireless signals. Each set of neural network input data may be based on a series of the wireless signals received. The statistical analysis may include the computation of statistical parameters based on a frequency-domain representation of the wireless signals. For example, in some implementations, the mean and standard deviation of respective frequency-domain representations of the wireless signals received at 802 are determined, as described above with respect to FIG. 3 (e.g., by populating the statistical parameter values in an initial matrix (e.g., the matrix 312 of FIG. 3)). The statistical parameter values may be used to generate the sets of neural network input data, which may include histogram data (e.g., the histogram data 404 of FIG. 4), an image of the statistical parameter values plotted against one or more axes (e.g., an image of the plot 402 of FIG. 4), or another type of data that is based on the statistical parameter values.

At 806, the sets of neural network input data are tagged with an indication of whether motion occurred in the space when the wireless signals were traversing the space. In some implementations, the neural network input data is tagged based on an analysis of the neural network input that includes the computation of check values (e.g., a balance value) as described above. In some implementation the neural network input data is tagged based on a training phase, as described above. Tagging the neural network input data may include appending a data field to the neural network input data that includes the indication. The tag for each set of neural network input data may indicate a category of motion, such as, for example, motion by a human, motion by an animal, or motion by an electrical fan. In some implementations, sets of the neural network input data associated with interference in the space are tagged with an indication that interference was present without motion.

At 808, the tagged neural network input data is processed to configure a neural network system to detect whether motion has occurred in the space based on untagged neural network data. The neural network system may include a convolutional neural network, in some instances. Processing the tagged neural network input data may include configuring the nodes of the neural network system to detect motion based on untagged neural network input data. In some implementations, configuring the nodes includes configuring one or more weights or biases associated with the respective nodes of the neural network system based on the minimization of a cost function, as described above. Once the nodes of the neural network system have been configured, untagged neural network input data may be processed by the neural network to detect whether motion has occurred in the space.

Figure 9:
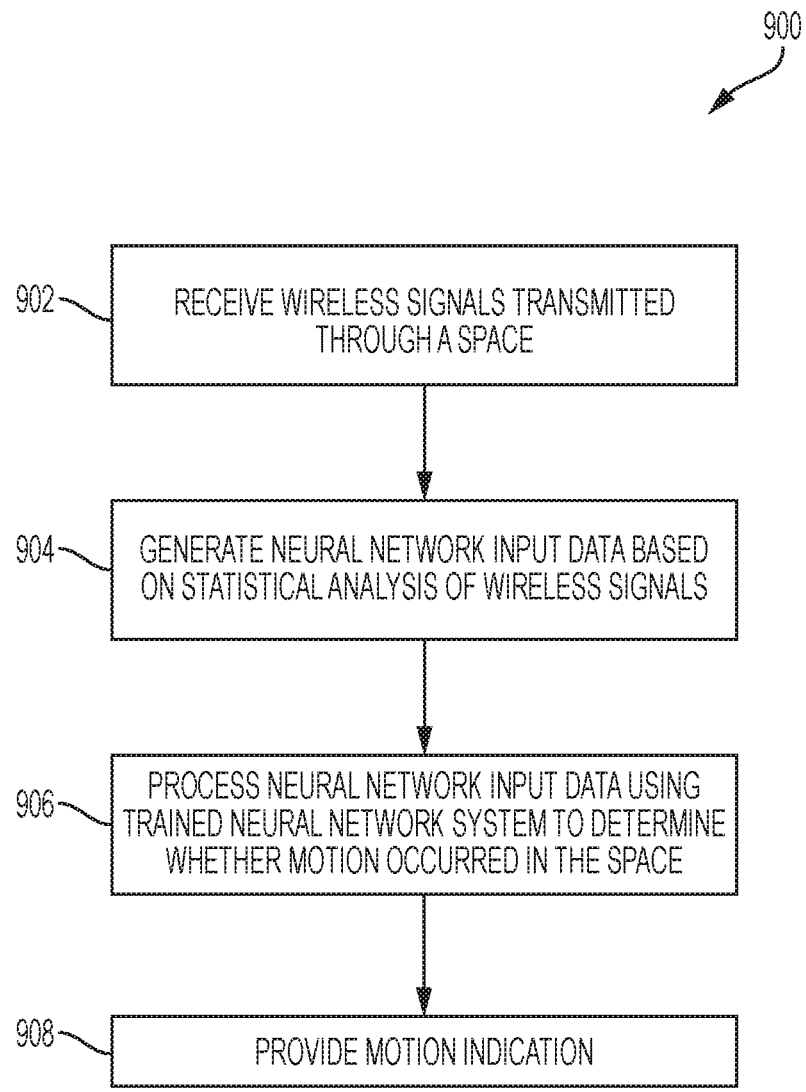
FIG. 9 is a flow diagram showing an example process for using a neural network to detect motion of an object in a space.

FIG. 9 is a flow diagram showing an example process 900 for using a neural network to detect motion of an object in a space. For instance, operations in the example process 900 may be performed by the processor subsystem 114 of the example wireless communication devices 102 in FIG. 1 to identify patterns, signatures, or other characteristics of input data that is based on statistical parameters of wireless signals received by wireless communication devices, and determine based on the patterns or characteristics whether motion has occurred in a space traversed by the wireless signals. The example process 900 may be performed by another type of device. The example process 900 may include additional or different operations, and the operations may be performed in the order shown or in another order. In some cases, one or more of the operations shown in FIG. 9 are implemented as processes that include multiple operations, sub-processes or other types of routines. In some cases, operations can be combined, performed in another order, performed in parallel, iterated, or otherwise repeated or performed another manner.

At 902, wireless signals transmitted through a space are received at a wireless communication device. The wireless signals may be radio frequency (RF) signals, and may include reference, beacon, or pilot signals used to determine changes in the RF channel, and detect whether motion has occurred in the space based on the changes. In some cases, the wireless signals are formatted according to a standard (e.g., channel sounding signals according to the IEEE 802.11-2013 standard). The wireless signals may be formatted in another manner.

At 904, sets of neural network input data are generated based on a statistical analysis of the wireless signals. Each set of neural network input data may be based on a series of the wireless signals received. The statistical analysis may include the computation of statistical parameters based on a frequency-domain representation of the wireless signals. For example, in some implementations, the mean and standard deviation of respective frequency-domain representations of the wireless signals received at 802 are determined, as described above with respect to FIG. 3 (e.g., by populating the statistical parameter values in an initial matrix (e.g., the matrix 312 of FIG. 3)). The statistical parameter values may be used to generate the sets of neural network input data, which may include histogram data (e.g., the histogram data 404 of FIG. 4), an image of the statistical parameter values plotted against one or more axes (e.g., an image of the plot 402 of FIG. 4), or another type of data that is based on the statistical parameter values.

At 906, the neural network input data is processed at a trained neural network system to determine whether motion occurred in the space when the wireless signals of 902 were traversing the space. The trained neural network system may have been trained using tagged neural network input data, as described above. In some cases, the neural network system includes a convolutional neural network (e.g., similar to CNN 704 of FIG. 7) and a fully-connected neural network (e.g., similar to FCNN 710 of FIG. 7). In some implementations, processing the neural network input data includes using the convolutional neural network to detect whether motion occurred for certain neural network input data, computing mean square error values for the sets of neural network input data (e.g., based on a most recent set of neural network input data), and providing the mean square error values as inputs to the fully-connected neural network, as described above with respect to FIG. 7.

At 908, a motion indication is provided by the trained neural network system. The motion indication may include an indication that motion has occurred in the space, a category of the motion detected (e.g., motion by a human, motion by an animal, motion by an electric fan), an indication of interference in the space, an indication of a quiet state, or another type of indication. In some implementations, after the motion indication has been provided, an action or programmed response may be taken. For example, a computing device (e.g., one of the wireless communication devices 102 of FIG. 1) may activate a security alert (e.g., send an alert to security personnel, to a homeowners' mobile phone, or to another device), activate lighting or HVAC in the location where motion was detected (e.g., in a room, a hallway, or outdoors), or perform a combination of these or other types of programmed responses.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer-readable storage medium for execution by, or to control the operation of, data-processing apparatus. A computer-readable storage medium can be, or can be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially generated propagated signal. The computer-readable storage medium can also be, or be included in, one or more separate physical components or media (e.g., multiple CDs, disks, or other storage devices). The computer-readable storage medium can include multiple computer-readable storage devices. The computer-readable storage devices may be co-located (instructions stored in a single storage device), or located in different locations (e.g., instructions stored in distributed locations).

Some of the operations described in this specification can be implemented as operations performed by a data processing apparatus on data stored in memory (e.g., on one or more computer-readable storage devices) or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. In some instances, the data processing apparatus includes a set of processors. The set of processors may be co-located (e.g., multiple processors in the same computing device) or located in different location from one another (e.g., multiple processors in distributed computing devices). The memory storing the data executed by the data processing apparatus may be co-located with the data processing apparatus (e.g., a computing device executing instructions stored in memory of the same computing device), or located in a different location from the data processing apparatus (e.g., a client device executing instructions stored on a server device).

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., non-magnetic drives (e.g., a solid-state drive), magnetic disks, magneto optical disks, or optical disks. However, a computer need not have such devices. Moreover, a computer can be embedded in another device, e.g., a phone, a tablet computer, an electronic appliance, a mobile audio or video player, a game console, a Global Positioning System (GPS) receiver, an Internet-of-Things (IoT) device, a machine-to-machine (M2M) sensor or actuator, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a stylus, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. The communication network may include one or more of a local area network ("LAN") and a wide area network ("WAN"), an internetwork (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In a general aspect of the examples described, motion detected using wireless signals is categorized.

In a first example, sets of tagged neural network input data are obtained at a neural network training system. Each set of tagged neural network input data is based on a statistical analysis of a series of wireless signals transmitted through a space over a respective time period, and each set of the tagged neural network input data includes a tag indicating whether motion occurred in the space over the respective time period. The sets of tagged neural network input data are processed by the neural network training system to parameterize nodes of a neural network system. Parameterizing the nodes configures the neural network system to detect motion based on untagged neural network input data.

Implementations of the first example may, in some cases, include one or more of the following features. The neural network training data may include histogram data for a set of statistical parameter values for the wireless signals. The histogram data may include a set of bins and a quantity for each bin, with each bin corresponding to a respective range for each of the statistical parameters. The histogram data may include an image of the statistical parameters plotted against one or more axes. The statistical parameters may include a mean and a standard deviation. Generating the histogram data may include obtaining a frequency-domain representation of the wireless signals, computing the statistical parameter values based on the frequency-domain representation of the wireless signals, populating the statistical parameter values into an initial matrix, and generating the histogram data based on the initial matrix.

Implementations of the first example may, in some cases, include one or more of the following features. The tag for each set of the tagged neural network input data may indicate a category of motion, and parameterizing the nodes may include configuring the neural network system to detect a category of motion based on untagged neural network input data. Additional sets of tagged neural network input data may be obtained at the neural network training system. Each additional set of tagged neural network input data may include a tag indicating whether interference was present in the space over the respective time period. The additional sets of tagged neural network input data may be processed, by operation of a neural network training system, to parameterize the nodes of the neural network system. Parameterizing the nodes may include configuring the neural network system to detect interference based on untagged neural network input data. The neural network system may include a convolutional neural network.

In a second example, multiple sets of neural network input data may be obtained at a neural network system. Each set of neural network input data may be based on a statistical analysis of a series of wireless signals transmitted through a space over a respective time period. The sets of neural network input data may be processed, by operation of the neural network system, through a plurality of programmed neural network nodes to determine whether motion occurred in the space during the respective time periods.

Implementations of the second example may, in some cases, include one or more of the following features. The neural network input data may include histogram data. Generating the histogram data may include obtaining a frequency-domain representation of the wireless signals, computing the statistical parameter values based on the frequency-domain representation of the wireless signals, populating the statistical parameter values into an initial matrix, and generating the histogram data based on the initial matrix. The statistical parameters may include a mean and a standard deviation. Determining whether motion occurred in the space may include generating an indication of motion by an object in the space, a category of motion that occurred in the space, interference present in the space, or an absence of motion in the space. The neural network system may include a convolutional neural network and a fully-connected neural network. The convolutional neural network may include multiple convolutional layers, a max-pooling layer after at least one of the convolutional layers, a flattening layer after the max-pooling layer, and multiple dense layers after the flattening layer. Processing the neural network input data through a plurality of programmed neural network nodes may include detecting, by the convolutional neural network, that motion occurred for a subset of the neural network input data, computing mean square error values for the subset of the neural network input data, and providing the mean square error values as input to the fully-connected neural network.

In some implementations, a system (e.g., a wireless communication device, computer system or other type of system communicatively coupled to the wireless communication device) includes a data processing apparatus and memory storing instructions that are operable when executed by the data processing apparatus to perform one or more operations of the first or second example. In some implementations, a computer-readable medium stores instructions that are operable when executed by a data processing apparatus to perform one or more operations of the first or second example.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of embodiments have been described. Nevertheless, it will be understood that various modifications can be made. Accordingly, other embodiments are within the scope of the following claims.

What is claimed is:

1. A motion detection method comprising:
   obtaining, at a neural network training system, multiple sets of tagged neural network input data, each set of tagged neural network input data based on a statistical analysis of a series of wireless signals transmitted through a space over a respective time period, each set of the tagged neural network input data comprising a tag indicating whether motion occurred in the space over the respective time period,
   wherein the tagged neural network input data comprises histogram data, and the statistical analysis comprises:
      obtaining a frequency-domain representation of the wireless signals,
      computing statistical parameter values based on the frequency-domain representation of the wireless signals,
      populating the statistical parameter values into an initial matrix, and
      generating the histogram data based on the initial matrix, the histogram data comprising a set of bins and a quantity for each bin, each bin corresponding to a respective range for each of the statistical parameters; and
   by operation of the neural network training system, processing the sets of tagged neural network input data to parameterize nodes of a neural network system;
   detecting motion, using the neural network system comprising the parameterized nodes, based on untagged neural network input data; and
   activating a security system or a physical device associated with the space where the motion was detected.

2. The method of claim 1, wherein the histogram data comprises an image of the statistical parameters plotted against one or more axes.

3. The method of claim 1, wherein the statistical parameters comprise a mean and a standard deviation.

4. The method of claim 1, wherein the tag for each set of the tagged neural network input data indicates a category of motion, and parameterizing the nodes configures the neural network system to detect a category of motion based on the untagged neural network input data.

5. The method of claim 1, comprising:
   obtaining, at the neural network training system, additional sets of tagged neural network input data, each additional set of tagged neural network input data comprising a tag indicating whether interference was present in the space over the respective time period; and
   by operation of the neural network training system, processing the additional sets of tagged neural network input data to parameterize nodes of the neural network system, wherein parameterizing the nodes configures the neural network system to detect interference based on the untagged neural network input data.

6. The method of claim 1, wherein the neural network system comprises a convolutional neural network.

7. A neural network training system comprising:
   a data processing apparatus; and
   memory comprising instructions that are operable when executed by the data processing apparatus to perform operations comprising:
      obtaining multiple sets of tagged neural network input data, each set of tagged neural network input data based on a statistical analysis of a series of wireless signals transmitted through a space over a respective time period, each set of the tagged neural network input data comprising a tag indicating whether motion occurred in the space over the respective time period,
      wherein the tagged neural network input data comprises histogram data, and the statistical analysis comprises:
         obtaining a frequency-domain representation of the wireless signals;
         computing the statistical parameter values based on the frequency-domain representation of the wireless signals;
         populating the statistical parameter values into an initial matrix; and
         generating the histogram data based on the initial matrix, the histogram data comprising a set of bins and a quantity for each bin, each bin corresponding to a respective range for each of the statistical parameters; and
      processing the sets of tagged neural network input data to parameterize nodes of a neural network system;
      detecting motion, using the neural network system comprising the parameterized nodes, based on untagged neural network input data; and
      activating a security system or a physical device associated with the space where the motion was detected.

8. The neural network training system of claim 7, wherein the histogram data comprises an image of the statistical parameters plotted against one or more axes.

9. The neural network training system of claim 7, wherein the statistical parameters comprise a mean and a standard deviation.

10. The neural network training system of claim 7, wherein the tag for each set of the tagged neural network input data indicates a category of motion, and parameterizing the nodes configures the neural network system to detect a category of motion based on the untagged neural network input data.

11. The neural network training system of claim 7, wherein the operations comprise:
   obtaining additional sets of tagged neural network input data, each additional set of tagged neural network input data comprising a tag indicating whether interference was present in the space over the respective time period; and
   processing the additional sets of tagged neural network input data to parameterize nodes of the neural network system, wherein parameterizing the nodes configures the neural network system to detect interference based on the untagged neural network input data.

12. The neural network training system of claim 7, wherein the neural network system comprises a convolutional neural network.

13. A motion detection method, comprising:
obtaining, at a neural network system, multiple sets of neural network input data, each set of neural network input data based on a statistical analysis of a series of wireless signals transmitted through a space over a respective time period,
wherein the neural network input data comprises histogram data, and the statistical analysis comprises:
  obtaining a frequency-domain representation of the wireless signals;
  computing statistical parameter values based on the frequency-domain representation of the wireless signals;
  populating the statistical parameter values into an initial matrix; and
  generating the histogram data based on the initial matrix, and
by operation of the neural network system, processing the sets of neural network input data through a plurality of programmed neural network nodes;
determining whether motion occurred in the space during the respective time period; and
responsive to determining motion occurred in the space, activating a security system or a physical device associated with the space where the motion was detected.

14. The method of claim 13, wherein the statistical parameters comprise a mean and a standard deviation.

15. The method of claim 13, wherein determining whether motion occurred in the space comprises generating an indication of motion by an object in the space, a category of motion that occurred in the space, interference present in the space, or an absence of motion in the space.

16. The method of claim 13, wherein the neural network system comprises a convolutional neural network and a fully-connected neural network.

17. The method of claim 16, wherein the convolutional neural network comprises:
multiple convolutional layers;
a max-pooling layer after at least one of the convolutional layers;
a flattening layer after the max-pooling layer; and
multiple dense layers after the flattening layer.

18. The method of claim 16, wherein processing the neural network input data through a plurality of programmed neural network nodes comprises:
detecting, by the convolutional neural network, that motion occurred for a subset of the neural network input data;
computing mean square error values for the subset of the neural network input data; and
providing the mean square error values as input to the fully-connected neural network to confirm whether motion did occur.

19. A neural network system comprising:
a data processing apparatus; and
memory comprising instructions that are operable when executed by the data processing apparatus to perform operations comprising:
  obtaining multiple sets of neural network input data, each set of neural network input data based on a statistical analysis of a series of wireless signals transmitted through a space over a respective time period,
  wherein the neural network input data comprises histogram data, and the statistical analysis comprises:
    obtaining a frequency-domain representation of the wireless signals;
    computing statistical parameter values based on the frequency-domain representation of the wireless signals;
    populating the statistical parameter values into an initial matrix; and
    generating the histogram data based on the initial matrix; and
  processing the sets of neural network input data through a plurality of programmed neural network nodes;
  determining whether motion occurred in the space during the respective time period; and
  responsive to determining motion occurred in the space, activating a security system or a physical device associated with the space where the motion was detected.

20. The neural network system of claim 19, wherein the statistical parameters comprise a mean and a standard deviation.

21. The neural network system of claim 19, wherein determining whether motion occurred in the space comprises generating an indication of motion by an object in the space, a category of motion that occurred in the space, interference present in the space, or an absence of motion in the space.

22. The neural network system of claim 19, wherein the neural network system comprises a convolutional neural network and a fully-connected neural network.

23. The neural network system of claim 22, wherein the convolutional neural network comprises:
multiple convolutional layers;
a max-pooling layer after at least one of the convolutional layers;
a flattening layer after the max-pooling layer; and
multiple dense layers after the flattening layer.

24. The neural network system of claim 22, wherein processing the neural network input data through a plurality of programmed neural network nodes comprises:
detecting, by the convolutional neural network, that motion occurred for a subset of the neural network input data; and
computing mean square error values for the subset of the neural network input data; and
providing the mean square error values as input to the fully-connected neural network to confirm whether motion did occur.

* * * * *